United States Patent [19]
Shaw et al.

[11] Patent Number: 5,264,835
[45] Date of Patent: Nov. 23, 1993

[54] ENHANCED COLOR DISPLAY SYSTEM AND METHOD OF USING SAME

[75] Inventors: Robert W. Shaw, Escondido; Randall S. Farwell, San Diego, both of Calif.

[73] Assignee: Proxima Corporation, San Diego, Calif.

[21] Appl. No.: 793,648

[22] Filed: Nov. 18, 1991

Related U.S. Application Data

[63] Continuation-in-part of Ser. No. 690,531, Apr. 23, 1991, abandoned, which is a continuation-in-part of Ser. No. 616,178, Nov. 19, 1990, which is a continuation-in-part of Ser. No. 586,506, Sep. 21, 1990, Pat. No. 5,225,875, which is a continuation-in-part of Ser. No. 546,238, Jun. 29, 1990, abandoned, which is a continuation-in-part of Ser. No. 506,621, Apr. 9, 1990, which is a continuation-in-part of Ser. No. 506,429, Apr. 9, 1990, abandoned, which is a continuation-in-part of Ser. No. 472,668, Jan. 30, 1990, abandoned, which is a continuation-in-part of Ser. No. 222,144, Jul. 21, 1988, abandoned.

[51] Int. Cl.⁵ .................................................. G09G 3/36
[52] U.S. Cl. ...................................... 345/150; 345/88; 345/89
[58] Field of Search .................. 340/71, 703, 765, 784, 340/793; 358/10, 11, 12, 17, 21 R, 27, 30, 140, 141, 455, 456, 457, 458, 459; 359/64, 68

[56] References Cited

U.S. PATENT DOCUMENTS

| | | | |
|---|---|---|---|
| Re. 33,836 | 3/1992 | Resor, III et al. | 355/43 |
| 4,531,160 | 7/1985 | Ehn | 358/240 |
| 4,536,856 | 8/1985 | Hiroishi | 364/900 |
| 4,631,692 | 12/1986 | Broedner | 340/701 |
| 4,760,387 | 7/1988 | Ishii et al. | 340/716 |
| 4,779,083 | 10/1988 | Ishii et al. | 340/767 |
| 4,827,255 | 5/1989 | Ishii | 340/793 |
| 4,886,343 | 12/1989 | Johnson | 340/784 |
| 5,074,648 | 12/1991 | Warszawski | 359/265 |
| 5,079,214 | 1/1992 | Long et al. | 503/227 |
| 5,091,784 | 2/1992 | Someya et al. | 340/784 |
| 5,124,695 | 6/1992 | Green | 340/784 |

*Primary Examiner*—Richard Hjerpe
*Attorney, Agent, or Firm*—Bernard L. Kleinke; Jerry R. Potts

[57] ABSTRACT

A multiple color display system employing a display device having a plurality of pixel elements each having a set of three subpixel components and a interfacing unit to couple a television signal to the active matrix panel. The interfacing includes a color enhancing unit for defining composite pixel groupings in the active matrix panel and for causing each grouping to produce in excess of 185 thousand different color shading levels.

19 Claims, 14 Drawing Sheets

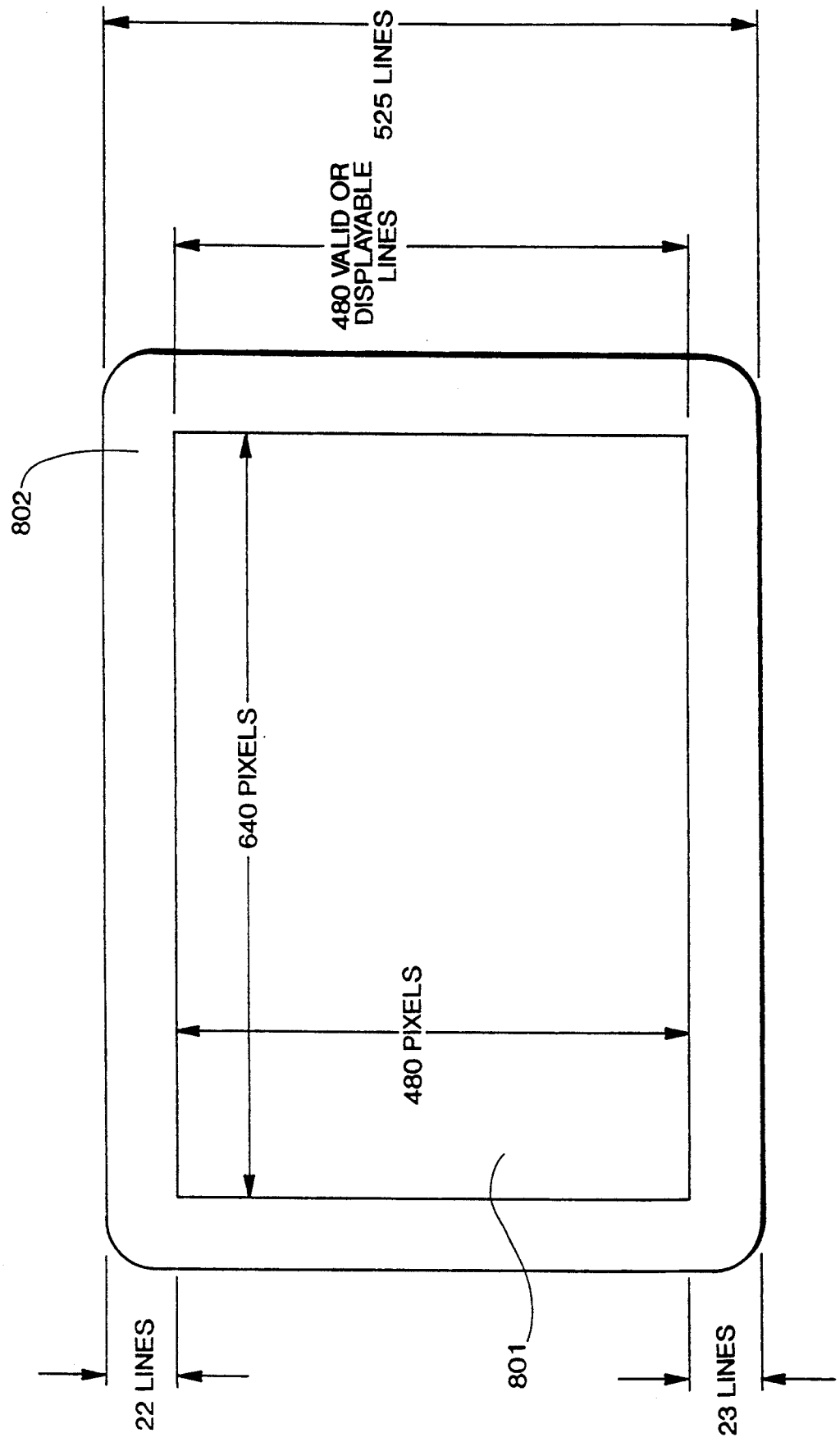

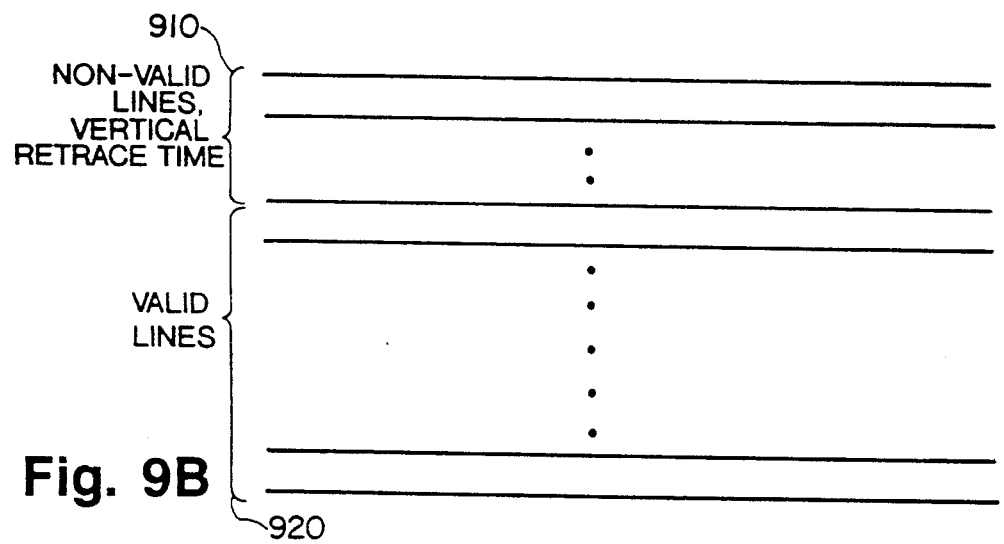
Fig. 9B  VERTICAL SYNC MARKERS BEGINNING OF NEW FRAME
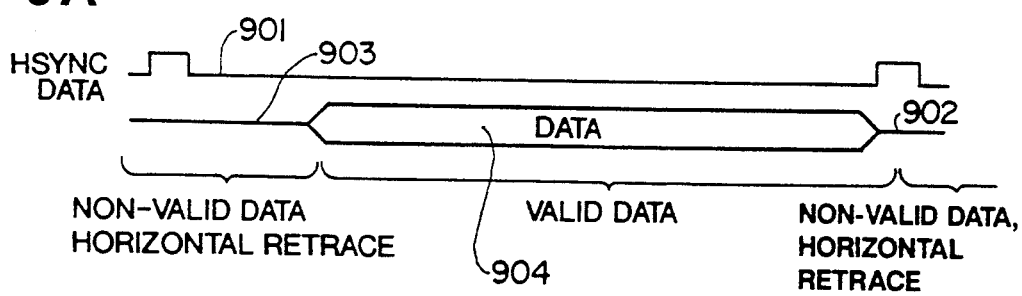
Fig. 9A  SYNC MARKS BEGINNING OF NEW LINE

ENHANCED COLOR DISPLAY SYSTEM AND METHOD OF USING SAME

CROSS REFERENCE TO RELATED APPLICATIONS

The present invention is a continuation-in-part of U.S. patent application Ser. No. 07/690,531, filed Apr. 23, 1991, entitled "VIDEO DISPLAY SYSTEM AND METHOD OF USING SAME," now abandoned, which is a continuation-in-part of U.S. patent application Ser. No. 07/616,178 filed Nov. 19, 1990, entitled "TELEVISION SIGNAL PROJECTION SYSTEM AND METHOD OF USING SAME," which is a continuation-in-part of U.S. patent application Ser. No. 07/586,506 filed Sep. 21, 1990, entitled "HIGH SPEED COLOR DISPLAY SYSTEM AND METHOD OF USING SAME," now U.S. Pat. No. 5,225,875, which is a continuation-in-part of U.S. patent application Ser. No. 07/546,238 filed Jun. 29, 1990 entitled "STACKED DISPLAY PANEL CONSTRUCTION AND METHOD OF MAKING SAME,", now abandoned, which is a continuation-in-part of U.S. patent application Ser. No. 07/506,621 filed Apr. 9, 1990, entitled "STACKED DISPLAY PANEL CONSTRUCTION AND METHOD OF MAKING SAME" which is a continuation-in-part of U.S. patent Ser. No. 07/506,429 filed Apr. 9, 1990, entitled "STACKED DISPLAY PANEL CONSTRUCTION AND METHOD OF MAKING SAME,", now abandoned, which is a continuation-in-part of U.S. patent application Ser. No. 07/472,668 filed Jan. 30, 1990 entitled, "LIQUID CRYSTAL DISPLAY PANEL SYSTEM AND METHOD OF USING SAME,", now abandoned, which is a continuation-in-part of U.S. patent application Ser. No. 07/222,144 filed Jul. 21, 1988, entitled "GRAY SCALE SYSTEM FOR VISUAL DISPLAYS," now abandoned. The foregoing patent applications are incorporated herein by reference.

TECHNICAL FIELD

The present invention relates in general to a video display system, and a method of usinq it. The invention more particularly relates to a method and apparatus for displaying a large projected full color display image generated from a television video signal.

BACKGROUND ART

There have been various different types and kinds of full color video display systems. Inventive techniques for producing such a full-color display include the use of direct view video or television monitors.

While such techniques have been satisfactory for some applications, direct video and television monitors are generally limited with respect to the size of the viewing image, due to the limited screen area associated with the cathode ray tube employed by such monitor units. Moreover, such systems have been relatively expensive to manufacture, since direct view video monitors are expensive.

Therefore, it would be highly desirable to have a new and improved full-color display system, which can produce a large television image for group viewing, without employing an expensive large direct view television monitor.

One attempt to over come the problem of having a limited viewing area has been to employ a rear view projection system, where a set of red, green and blue images are projected onto the rear side of a large transparent screen for viewing purposes. While this technique may satisfactory for some applications, it has proven to be relatively expensive to manufacture and requires a large cumbersome display unit cabinet which is difficult to move from place to place. In addition, the brightness of the viewed images is somewhat restricted or impaired due to the loss of light in traversing the transparent screen.

Therefore, it would be highly desirable to have a new and improved video display system for displaying large color images produced from a television signal which would be relatively inexpensive and that would not be difficult to move from place to place for viewing purposes.

Another attempt to overcome the problem associated with poor luminance in a large screen viewing system, has been to employ a direct front projection system. The direct projection system is similar to the rear view system except that the red, green and blue images are projected onto the front surface of a large reflective screen from a projection unit disposed in front of the screen. Again, while such a technique has proven satisfactory for some applications, the projection unit has typically been mounted in a permanent location relative to the screen, for proper focusing and to assure that a sufficient amount of light is projected onto the screen to provide an image with sufficient brightness for viewing purposes.

Therefore, it would be highly desirable to produce large screen viewing images having a relatively high luminance level and not being required to be permanently mounted or otherwise positioned.

Another attempt to overcome the problem associated with poor luminance has been to use a high speed active matrix panel with an overhead projector for the display of information. Such flat high speed active matrix panels have been capable of producing full color displays with thousands of bright colors. Such a large number of colors however has been possible only by using very sophisticated duty cycling techniques so that individual pixels in the liquid crystal display device may be selectively modulated to produce multiple intensity levels. While such duty cycle techniques have been successful for the high speed active matrix liquid crystal panels, a less sophisticated approach may be warranted for slower speed active matrix panels. Therefore, it would be highly desirable to be able to produce thousands of different bright colors in a low speed liquid crystal display panel without using a sophisticated duty cycle technique.

One attempt at producing a large number of colors using an active matrix display is di in U.S. patent application Ser. No. 07/690,531. In this regard, a low speed active matrix panel is interfaced to a controller which includes a pattern circuit for configuring pixel elements in groups to define composite pxels which are selectively energized to produce in excess of 24,000 different color shading levels by each composite pixel group. While such a composite grouping technique has been successful for slow speed active matrix panels, it would be highly desirable to produce even a larger number of different shading levels to significantly improve the color resolution of displayed images.

DISCLOSURE OF INVENTION

Therefore, the principal object of the present invention is to provide a new and improved video display system and method of using it to produce large displayable images generated from conventional signals.

Another object of the present image is to provide such a new and improved video display system, which is relatively inexpensive to manufacture and which is easily transmitted for convenient viewing purposes.

Yet another object of the present invention is to provide such a new and improved video display system which produces a video image having a large number of discrete color shadings having relatively high luminance levels.

Briefly, the above and further objects of the present invention are realized by providing a multiple color display system employing an interface unit to couple a television video signal producing device to a relatively low speed display panel, such as an LCD active matrix panel, adapted for positioning on a conventional photographic projector for displaying large video images. The display panel includes a matrix of pixel elements with each individual pixel element having a group of subpixel elements. Each subpixel element produces at least N shading levels of an individual color in response to the television video signal. The interface unit include scaling circuits for enabling each individual one of the pixel elements to produce X shading levels of a plurality of individual colors, where X is substantially larger than N. A set of pattern circuits cooperates with the scaling circuits for facilitating the converting of the television video signal into a group of binary signals for driving individual ones of the subpixel elements so that each one of the subpixel elements can display N shading levels of individual ones of the plurality of individual colors. The scaling and pattern circuits enables pixel elements in the low speed active matrix panel to be configured in a group, such as a group of four pixel elements. In this regard, the four pixel elements are combined to define a single composite pixel group where combinations of subpixels in each of the groups are selectively energized to 1 of 8 levels so that in excess of 185,000 different color shading may be exhibited by the composite pixel group.

The interface unit also employs a format timing generator for formatting the video signal so that it may be displayed in a conventional matrix array, such as a 640 by 480 matrix array, employed by the low speed display device.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIG. 8 is a schematic diagram illustrating a matrix array developed by the format timing generator of FIG. 5; and FIG. 9A is a horizontal formatting timing diagram for helping to understand the operation of the format timing generator of FIG. 5;

FIG. 9B is a vertical formatting timing diagram for helping to understand the operation of the format timing generator of FIG. 5;

BEST MODE FOR CARRYING OUT THE INVENTION

The detailed description of the present invention is organized in accordance with the following outline:

A. GENERAL SYSTEM DESCRIPTION (FIG. 1)
  A.1. Overhead Projector (FIG. 2)
  A.2. Active Matrix Panel (FIG. 3)
  A.3. Interface Unit (FIG. 3)
  A.3.1. Signal Converter (FIG. 3)
B. COLOR ENHANCING OPERATION
C. DETAILED DESCRIPTION OF INTERFACE CONTROLLER
  C.1. Format Timing Generator (FIG. 5)
    C.1.1. Microprocessor Operation (FIG. 6)
    C.1.2. Operation of Format Timing Generator (FIGS. 7A, 7B)
  C.2. Memory Controller (FIG. 11)
  C.3. Video Controller (FIG. 11)
    C.3.1. Interrupt Program (FIGS. 4, 11)
D. DETAILED DESCRIPTION OF COLOR ENHANCING UNIT
  D.1. 2×2 Pattern Logic Unit
    D.1.1. 2×2 Pattern Logic Equations and Truth Table
  D.2. 1×2 Pattern Logic Unit
    D.1.2. 1×2 Pattern Logic Equations and Truth Table

A. GENERAL SYSTEM DESCRIPTION

Figure 1:
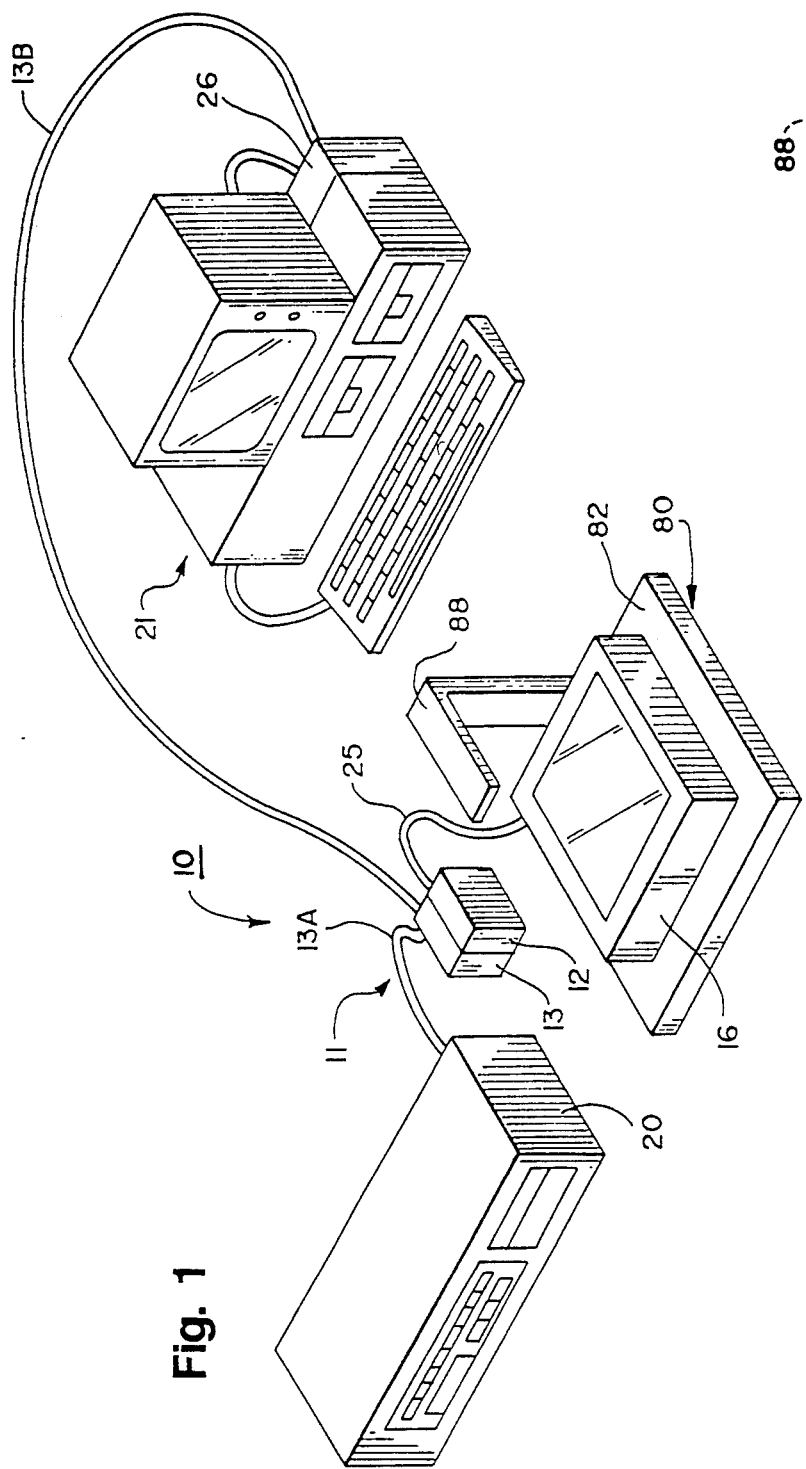
FIG. 1 is a pictorial, partially diagrammatic view of a television projection system, which is constructed in accordance with the present invention, and which is illustrated being employed in a television signal driven, overhead projection arrangement.

Referring to the drawings, and more particularly to FIG. 1, there is illustrated a television signal projection system 10, which is constructed in accordance with the present invention, and which is adapted for use as a video display system capable of displaying a very large full color screen image. Thus, the system 10 is a display projection system, and is employed in an overhead projection arrangement.

As shown in FIG. 1, the system 10 is adapted for use in an arrangement employing a television signal generating source, such as a video cassette recorder 20 with a conventional video cassette (not shown), and an overhead projection system 80. The video cassette recorder 20 supplies a conventional National Television Standards Committee (NTSC) signal (USA) or a PAL signal (Europe) as generated for displaying an image from a broadcast television signal source.

The system 10 generally comprises a display drive unit 11 for translating the conventional television video output signal from the video cassette recorder 20 into video signals capable of hundreds of thousands of different color shadings and hues for display by a display device, such as a thin film transistor active matrix liquid crystal display panel 16 for displaying color images produces from the video signals. The drive unit 11 also translates conventional computer video output signals produced by a personal computer 21 having a video drive module 26 as more fully disclosed in copending U.S. patent Ser. No. 07/586,506 mentioned herein. In this regard, the drive unit 11 includes a color enhancing interface controller 12 coupled by an interface unit 13 to either the video cassette recorder 20 or the video drive module 26. The interface controller 12 includes a format timing generator 45 for formatting the television signal for displaying images on the display device 16. The interface unit 13 is connected to the recorder 20 and the module 26 by a pair of cables 13A and 13B respectively.

Figure 12:
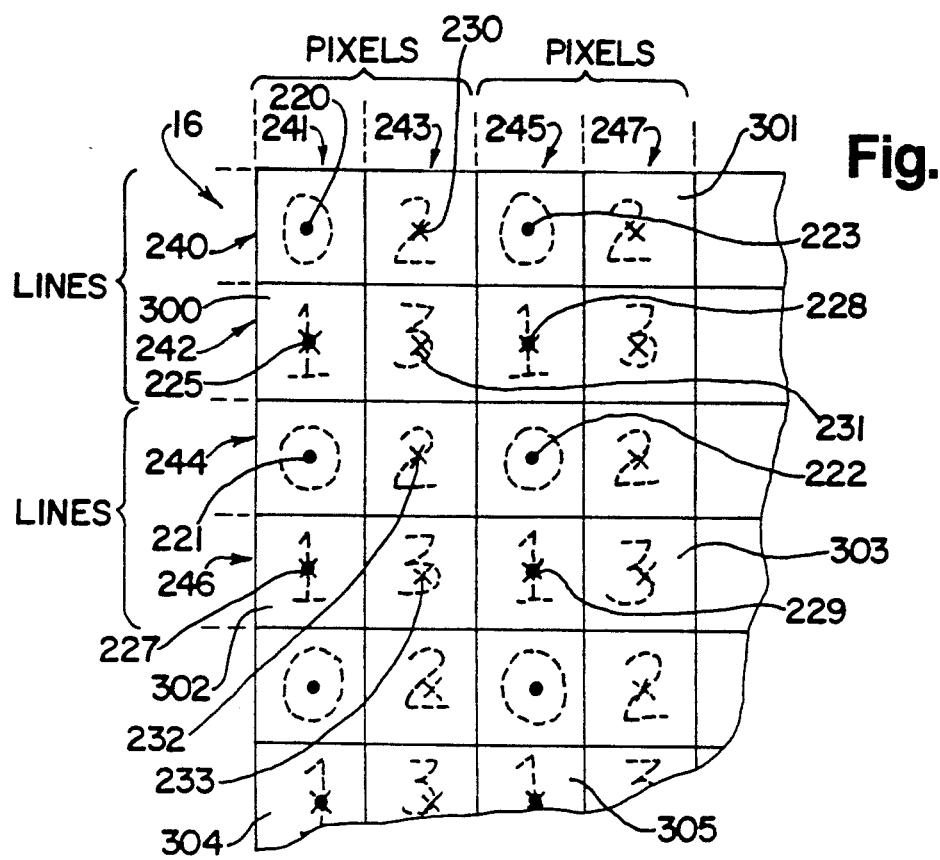
FIG. 12 is a diagrammatic representation of a group of pixel element within an active matrix panel of FIG. 4.

Referring now to FIG. 12, there is shown the active matrix panel 16 illustrating a group of composite pixels 300-305 arranged in rows or lines, such as lines 240, 242, 244 and 246, and columns or pixels 241, 243, 245 and 247. As each Composite pixel 300-305 is substantially the same only composite pixel 300 will be described hereinafter in greater detail.

Considering now the composite pixel 300 in greater detail with reference to FIG. 12, the composite pixel 300 consists of a 2×2 pixel element matrix divided into a group of pixel elements 220, 225, 230 and 231 identified as 0, 1, 2 and 3 in dotted lines. The four pixel element matrix consists of two lines or rows 240 and 242, respectively and two columns of pixel groupings 241 and 243, respectively. The rows and columns of pixel elements define a pixel group, such as the group 300 for example. As will be explained hereinafter in greater detail, a color enhancing interface controller 12, causes selected ones of the active matrix pixel elements in each of the composite pixel groups, such as group 300, to be assigned intensity levels for forming the composite pixel grouping. In this regard, as best seen in FIG. 12, the input data for the pixel element 220 is used to define an intensity level to the pixel element at line 240. Each pixel element, such as pixel element 220 includes three sub-pixel elements (not shown) one for each primary color red, green, and blue. In such an arrangement therefore, it should be understood that in each one of the groups, such as the group 300, the individual pixel elements, such as pixel elements 220, 225, 230 and 231 will be selectively energized to one of 15 shades of color for each of the primary colors red, green and blue. Thus, by combining selectively certain ones of the pixel elements, such as the pixel elements in composite group 300, in excess of 185,000 different color combinations may be produced in the composite pixel 300.

Figure 3:
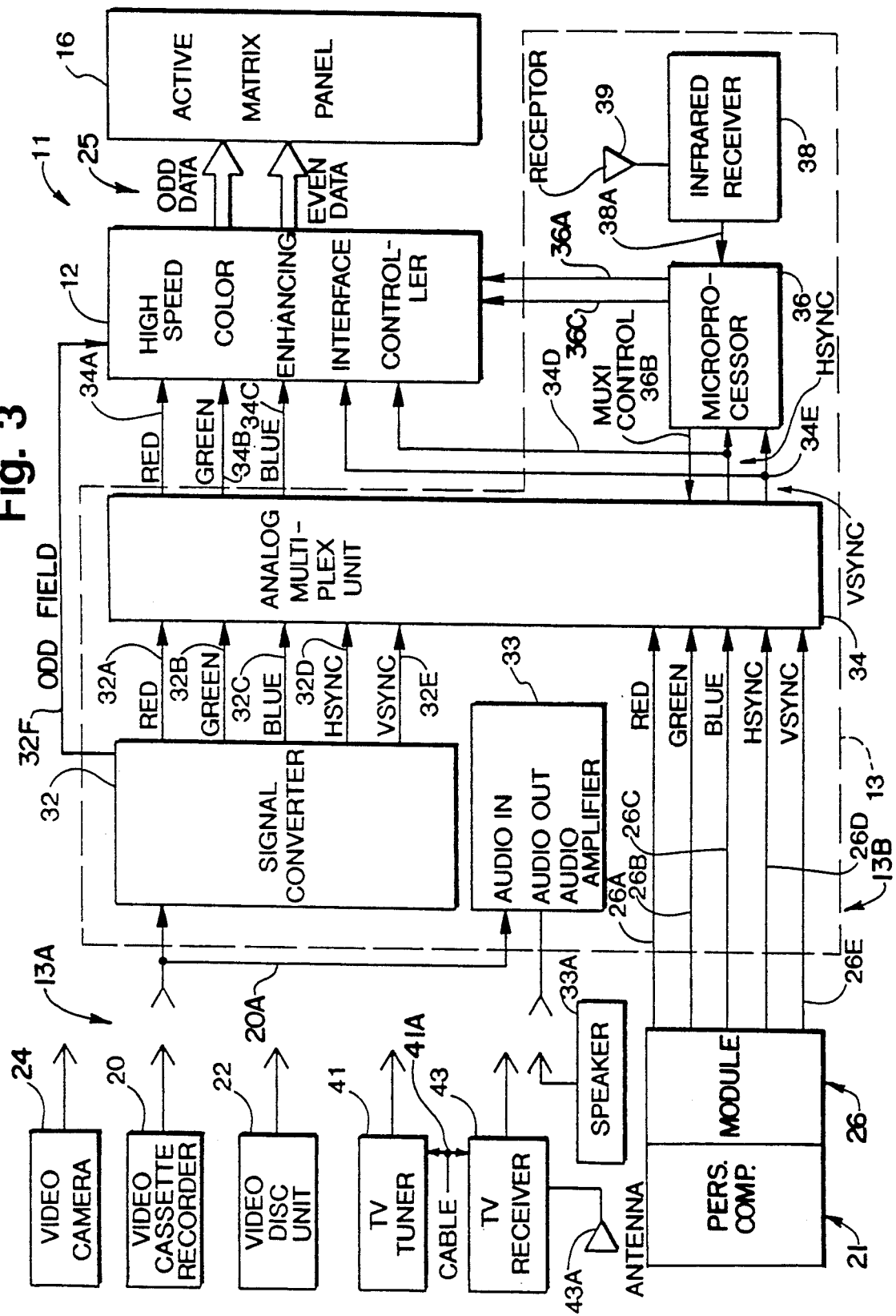
FIG. 3 is a block diagram of a display drive unit of FIG. 1.

Although in the preferred embodiment of the present invention, the drive unit 11 is shown interfaced to the video cassette recorder 20 it will be understood by those skilled in the art that other similar television signal generating sources, such as a video disc unit 22, a video camera 24 a television tuner 41 or a television receiver 43 having an antenna 43A could also be employed as shown in FIG. 3.

The interface unit 13 converts the NTSC signal into an analog signal indicative of the red, green, blue color components of the display image along with the horizontal and vertical synchronizing or scanning signals HSYNC and VSYNC for generating a standard television scan raster in which the image is displayed. The color enhancing interface controller 12 not only provides the necessary control functions to couple the interface unit 13 to the display device 16 but also quantizes the conventional RGB analog signal so that a very large number of colors can be displayed by the active matrix panel 16. As best seen in FIG. 1, the color enhancing interface controller 12 is coupled to the active matrix panel by a cable 25.

The video cassette recorder 20 may be any conventional video cassette recorder, such as manufactured by SONY Corporation or RCA, Inc. which is capable of generating a standard NTSC signal when playing a video cassette with prerecorded video television image information. The video cassette recorder 20 can be connected to a CATV cable 41A or a standard television antenna for coupling line broadcast signals to the drive unit 11. The display device 16 in cooperation with the video cassette recorder 20 and the overhead projector system 80 enables a user to view any prerecorded video television image information in a large projected image format.

A.1. Overhead Projector

Figure 2:
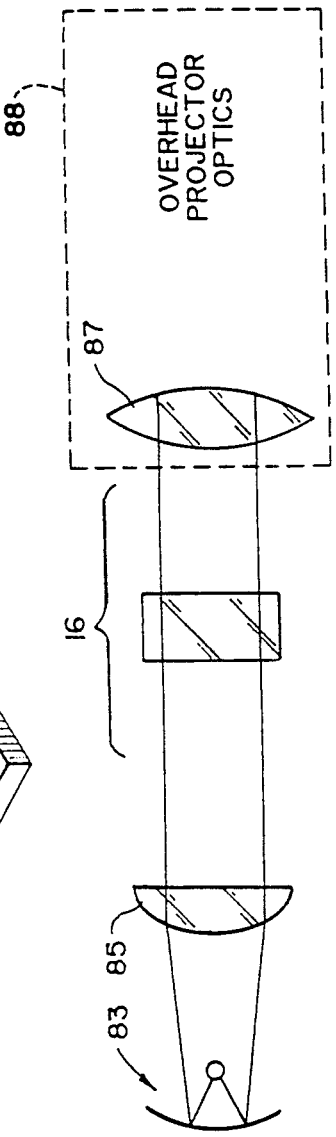
FIG. 2 is a diagrammatic view of the system and the arrangement of FIG. 1.

Considering now the overhead projection device 80 in greater detail with reference to FIGS. 1 and 2, the projection device 80 generally includes a flat transparent projection surface 82 which is adapted to support the active matrix panel 16 for image projection purposes. The overhead projection device 80 includes an illumination bulb and a reflector shown generally at 83 (FIG. 2) for transmitting light through the panel 16.

In order to collimate the light produced by the bulb and reflector 83 into the panel, a collimating Fresnel lens 85 is disposed within the overhead 16 projector 80. In this regard the optics assembly 88 enables light passing through the panel 16 to be focused onto a projection screen or other suitable viewing surface (not shown), for audience display purposes.

While in the preferred form of the present invention the Fresnel lens 85 and 87 are disposed on the panel 16, it will be understood by those skilled in the art that the lens may be disposed in a case (not shown) for supporting the lens 85 and 87 in a spaced-apart manner from the panel 16. In this regard, the television signal projection system 10 and the method of using it, enables a full color display image to be projected on to any suitable viewing surface in a relatively easy and convenient manner using relatively inexpensive commercially available equipment which may be easily set up for viewing purposes.

A.2. Active Matrix Panel

The active matrix thin film transistor liquid crystal panel 16 includes a pixel matrix array for generating a selected number of image elements in a 640 by 480 pixel array having a primary color arrangement (red, green, blue) for forming the prerecorded television video image stored on the video cassette cartridge (not shown). It will be understood by those skilled in the art that the television video image may be generated from a television signal which is broadcast and received by a television receiver or generated by a television camera directly coupled to the interface unit 13 as shown in FIG. 3. The active matrix panel 16 is more fully described in copending U.S. patent application Ser. No. 07/586,506 referenced herein.

TABLE I

| Type of Video Signal | Video Signal Source HSYNC rate |
| --- | --- |
| NTSC | 15.750 KHz |
| VGA Graphics | 31.47 KHz |

As best seen in FIGS. 1 and 3, the system 10 is adapted for use with any conventional television signal source for producing a video image, such as the NTSC and VGA GRAPHIC signals. Table I specifies the HSYNC rate for two of the conventional video signal sources. As will be explained hereinafter in greater detail, although the system 10 converts such signals, into re-formatted signals that are capable of driving the active matrix panel 16 having a 640 by 480 pixel array.

FIG. 8 illustrates a typical display method of the present system 10. In this regard, for illustrative purposes a typical NTSC display format of 525 lines is shown with a 640 by 480 pixel array, shown generally at 801. The NTSC signal occupies a display area shown generally at 802 and consists of two interlaced 60 Hz fields of 262.5 line each, combining to give a 30 Hz, 525 lines of video information. Because the vertical resolution of the panel 16 is less than the vertical resolution provided by the NTSC signal, the present system 10 effectively fits the NTSC display configuration into the 480 lines of vertical resolution for the panel 16. The controller 12 formats the NTSC signal by ignoring the first twenty two horizontal lines and the last twenty three horizontal lines in each frame of video information, resulting in 480 valid lines (525 lines − 22 lines − 23 lines = 480 lines). This is an effective practice since the disregarded lines consist of the "overscan" (invisible) lines of the extreme top and bottom portions of the displayed image, which typically contains little or no meaningful video information.

The width of the NTSC picture is also matched or formatted into a 640 pixel width for use by the panel 16. In this regard, the controller 12 adjusts the sampling rate of the video signal as will be expained hereinafter in greater detail.

A.3. Interface Unit

Considering now the interface unit 13 in greater detail with reference to FIG. 3, the interface unit 13 generally includes a signal converter 32 for converting the NTSC television signal from the video cassette recorder 20 into an analog RGB signal suitable for driving the controller 12. The NTSC television signal is coupled to the input of the signal converter 32 by a conductor 20A. As best seen in FIG. 3, the interface unit 13 has its input also coupled to the video drive module 26 whose output signals are already in an analog RGB format suitable for driving the controller 12. In this regard, the video drive module 26 in the personal computer 21 has five output signals red, green, blue, horizontal synchronization (HSYNC), and vertical synchronization (VSYNC) coupled to the interface unit 13 on the cable 13B having a set of conductors 26A-E respectively.

In order to enable a user to select between input signals from the video cassette recorder 20 and the video drive module 26, the interface unit 13 also includes an analog multiplex unit 34 and a microprocessor 36. The analog multiplex unit 34 is a conventional multiplexer allowing either the output signals from the signal converter 32 or the output signals from the video drive module 26 to be coupled to the color enhancing interface controller 12. The microprocessor 36 determines which of the video source standards (VGA Graphics, NTSC, PAL, etc.) are to be coupled to the color enhancing interface controller 12. In this regard, the microprocessor 36 allows only one of the source standard signal to be coupled to the controller 12. Signals are coupled from the analog multiplex unit 34 to the controller 12 on a set of conductors 34A-E respectively. Once the microprocessor 36 determines the type of video standard to be supplied to the controller 12, the microprocessor 36 generates appropriate format data and commands on a command/data line 36A (FIG. 5) for establishing a proper sample rate and format of lines and pixels locations for driving the active matrix unit 16. The microprocessor 36 also generates a control signal (MUX CONTROL) which switches the multiplex unit 34 to receive and pass to the controller 12, either the input signals from the signal converter 32 or the input signals from the video drive module 26. The control signal, MUX CONTROL is coupled to the multiplex unit 34 on a conductor 36B.

The interface unit 13 also includes an infrared receiver 38 having a receptor 39 for receiving infrared signals from a remote infrared transmitter unit (not shown). In this regard, a user may actuate the infrared transmitter unit for generating a signal which causes the microprocessor 36 to search for a different type of video source signal by switching the multiplex unit 34. The infrared receiver 38 is a conventional infrared receiver unit whose output is coupled to the microprocessor 36 on a conductor 38A.

For the purpose of amplifying the low level audio signal that accompanies the video source signals, the interface unit 13 also includes an audio amplifier 33 having an output jack adapted to be connected to a conventional speaker, such as speaker 33A. The audio amplifier 33 is conventional, such as a model TDA1013B sold and manufactured by Signetics and described in the Signetic "Linear Data Manual," Volume 1 (1989) pages 7-207.

A.3.1. Signal Converter

Considering now the signal converter 32 in greater detail with reference to FIG. 3, the converter 32 is of a type well known to those skilled in the art, such as a TDA 3330 unit manufactured by Motorola and described in the Motorola Linear/Interface Devices Data Book, page 9-183 through 9-190, and in Motorola Application note AN1019D. Other type of converters for converting a PAL signal or a SECAM signal to an RGB signal are also well known. For example a combination PAL-SECAM-NTSC to RGB converter is available from SGS THOMSON at 1000 East Bell Road, Phoenix, Ariz. under part number TEA 5640C as described in the SGS THOMSON Video IC's Data Book, pages 1211-1227. As the signal converter 32 is well known, it will not be described herein in greater detail. The output signals of the signal converter 32 are coupled to the analog multiplex unit 34 on a set of conductors 32A-E carrying the respective signals of red, green, blue, horizontal synchronization (HSYNC) and vertical synchronization (VSYNC).

B. COLOR ENHANCING OPERATION

Figure 4:
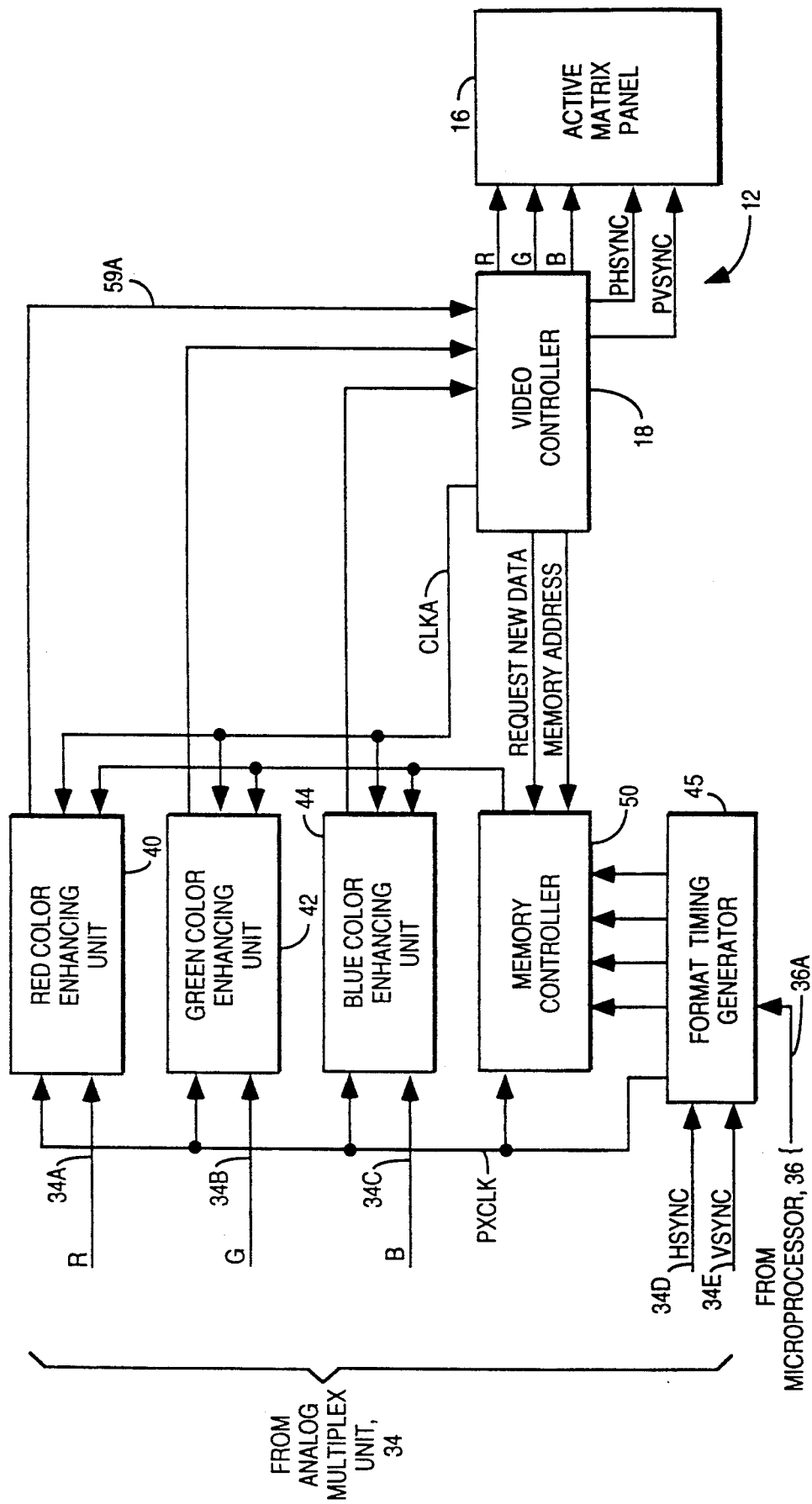
FIG. 4 is a block diagram of a color enhancing interface controller of FIG. 3.

Considering now the color enhancing operation according to the present invention, the interface controller 12, as shown in FIGS. 3 and 4, is coupled between the active matrix panel 16 via cable 25 and the output of the analog multiplex unit 34. In this regard, from the analog multiplex unit 34, output signals RED, GREEN, BLUE, horizontal synchronization (HSYNC) and vertical synchronization (VSYNC), are coupled to the input of controller 12 via a set of conductors 34A-E respectively.

The color enhancing interface controller 12 as best seen in FIG. 4, generally comprises a video controller 18 for controlling the video data supplied to the active matrix panel 16, a set of color enhancing units 40, 42, 44 for quantizing the video data supplied from the interface unit 13, a memory controller 50 for controlling the storing and retrieval of the quantized video data, and a format timing generator 45 for helping to format the video data to be displayed. As the memory controller 50 is substantially similar to the controller described in copending U.S. patent application Ser. No. 07/616,178, only the color enhancing units 40, 42, 44 and formatting timing generator 45 will be considered in greater detail.

Considering now the enhancing units 40, 42 and 44 with reference to FIG. 4, only one enhancing unit, enhancing unit 40, will be described in greater detail as each of the enhancing units 40, 42 and 44 are substantially similar to one another.

Figure 5:
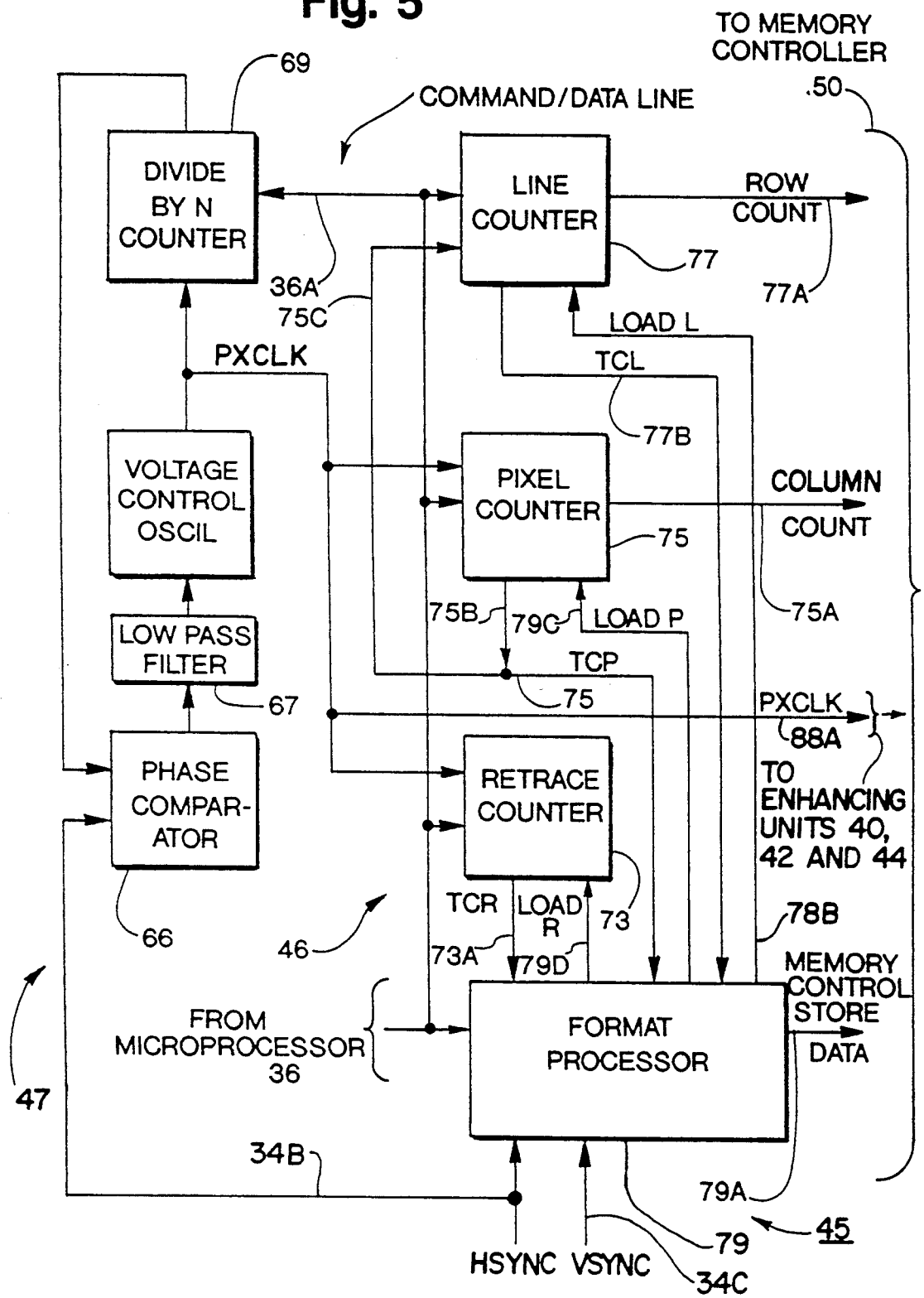
FIG. 5 is a functional block diagram of a format timing generator of the color enhancing interface controller of FIG. 3.
Figure 5A:
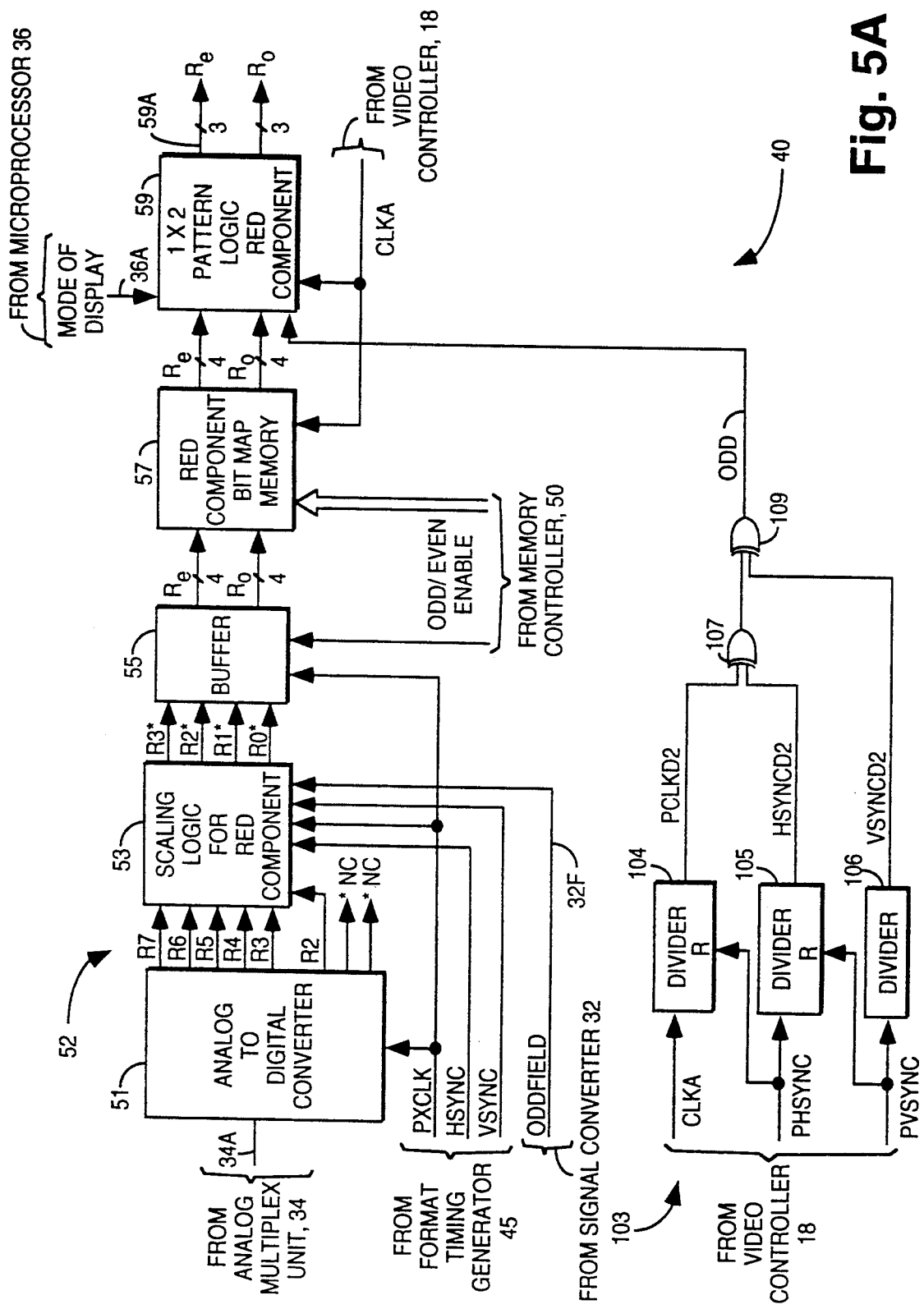
FIG. 5A is a block diagram of an enhancing unit of FIG. 4.

As best seen in FIGS. 4 and 5A, the color enhancing unit 40 generally comprises an analog to digital converter 51 for converting the red component of the raw RGB analog signal into a 6-bit digital signal, and a scaling arrangement 52 for processing and storing temporarily the digitized signal.

The scaling arrangement 52 generally includes a scaling unit 53 for processing the 6-bit digitized signal into a 4-bit gray scale signal to enable individual pixel elements within a composite pixel grouping. As shown in FIG. 12, the pixel elements of the active matrix panel 16 are arranged in groups of four pixel elements in a two by two arrangement as indicated generally at 300, such as subpixel element 220. The conventional active matrix panel 16 employs a triad pixel element each comprising red, blue and green subpixel elements. FIG. 12 illustrates only one of the three subpixel elements for illustration purposes, it being understood that the remaining two subpixel elements of each triad operating in a similar manner under the control of the remaining two color enhancing units 42 and 44, respectively. Moreover, each subpixel element is controlled by a 3-bit signal from its corresponding color enhancing unit. Each 3-bit signal provides 8 shading levels of a single color.

The scaling unit 53 converts the 6-bits of data indicative of 64 different shading levels into 4 groupings of a maximum of 16 shading levels, which are assigned to individual ones of the subpixel elements of each composite pixel, in quadrants 0, 1, 2 and 3 thereof.

For example, if the six-bits of input data are quantized to a shading level 43, the scaling logic 53 converts the 6-bit level signal into a 4-bit signal, which corresponds to one of the subpixel elements in quadrants 0, 1, 2, and 3 (FIG. 12). In this regard, the four-bit signal is used to control each one of the subpixel elements during a display frame. For level 43, the 4-bit signal indicates, at different times, during a given display frame, levels of 11, 11, 10 and 11 for the respective subpixel elements 220, 225, 230, and 231. It should be apparent to those skilled in the art, that since each subpixel can only be activated to a maximum of 8 shading levels, the levels greater than 8 are not possible for such an active matrix panel. Thus, according to the present invention, the pattern logic unit 59 converts the 4-bit signal to a 3-bit signal for controlling each subpixel element. Hence, the 3-bit signal can cause only 8 shading levels to be produced by each subpixel. However, frame modulating a specific pixel between two adjacent intensity levels from frame to frame can generate 15 levels of gray scale. in other words, by switch between two specific levels, such as level 4 and 5 on a frame by frame basis for a given intensity level, the pixels exhibit a gray scale level between levels 4 and 5.

In the level 43 example, the 4-bit levels 11, 11, 10 and 11 are converted on a frame to frame basis for 11 and 10 respectively to 5, 5, 5 and 5 and 5, 5, 4, 5, for energizing the 4 subpixels of the composite pixel. The 1×2 pattern logic 55 causes each of the subpixels to be frame modulated between intensity levels 5 and 4 thus, grey scaling the composite pixel image. As a result, a gray scale weighing is used to achieve the desired larger number of shading levels from the composite pixel elements.

It should be understood that theoretically there are in a composite pixel, 64 shading levels for each primary color of red, green and blue, to provide a total number of 64 to the third power possible levels. However, there are many redundant conditions, since different pattern combinations of levels within a composite pixel result in the same perceived image. Thus, in an actual working model of the inventive system, because of the redundancies, only 57 of the 64 combinations of levels can actually be produced by the composite pixel for each individual color. The total number of colors which may be exhibited by any one composite pixel is $57^3$ or 185,186 colors, since each individual pixel element in the composite pixel, includes three subpixel elements; i.e., one for each of the primary colors red, green and blue.

The scaling arrangement 52 also includes a buffer unit 55 and bit map memory unit 57 for temporarily storing the gray scale signals.

Figure 5B:
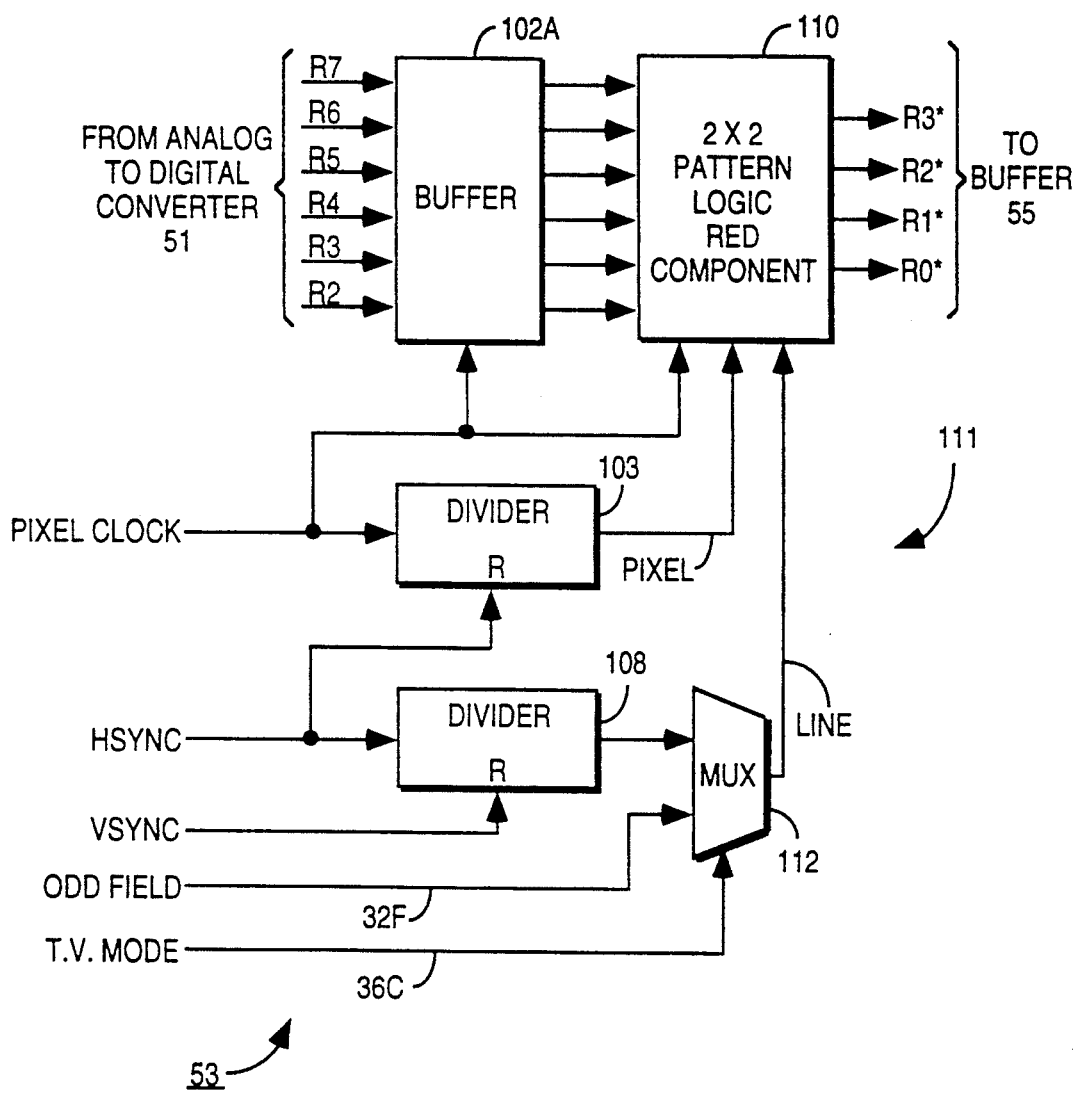
FIG. 5B is a block diagram of the scaling logic for the enhancing unit of FIG. 5A.

Considering now the scaling unit 53 in greater detail with reference to FIG. 5B, the scaling unit 53 generally includes a buffer unit 102A for temporarily storing the data digitized by the analog to digital converter 51 and a 2×2 pattern logic unit 55 for gray scaling the 6-bits of digitized data into a 4-bit gray scale code. The 2×2 pattern logic unit 110 is coupled between the output of the buffer unit 102A, and the input of the output buffer unit 55 for temporarily storing or latching the video data to be stored into the bit map memory 57.

The enhancing unit 40 also includes a 1×2 pattern logic unit 59 connected between the output of the bit map memory 57 and the video controller 18 for forming video data to enable individual pixel elements to be activated.

The buffer 55, and the bit map memory 57 are substantially similar to the corresponding units more fully described in copending U.S. patent application, Ser. No. 07/616,178 and will not be described hereinafter in greater detail.

For the purpose of gray scaling the output data to the active matrix panel 16, the enhancing unit 40 further includes a pattern reversal circuit indicated generally at 103. In this regard, pattern reversal circuit 103 causes the pattern arrays in each composite pixel, such as composite pixel 300 to be reversed on a frame by frame basis making the static patterns dynamic gray scale shades.

C. DETAILED DESCRIPTION OF INTERFACE CONTROLLER

C.1. Format Timing Generator

In operation, as will be explained hereinafter in greater detail, the 2×2 pattern logic unit 110 quantizes and encodes the input video data for processing by the 1×2 pattern logic unit 59 in order to combine video pixel element signals to form a composite color pixel to increase the number of displayable color shadings. In this regard, the 2×2 pattern logic unit 110 reduces or quantizes the amount of data that is stored in the bit map memory 56 by disregarding the two least significant bits for each pixel element location and by enabling only the 6 most significant bits to be latched in the buffer 102A. In this regard, when data is latched into the buffer 102A and scaled by the 2×2 logic unit 110 produces a 4-bit output signal which is latched into the output buffer 55, as signals R3*-R0* respectively.

Considering now the format timing generator 45 in greater detail with reference to FIGS. 4 and 5, the format timing generator 45 generally comprises a programmable counter arrangement 46 for helping to format the video data to be stored in the controller 12, a programmable pixel clock generator 47 for establishing a proper sampling rate based upon the type of video signal being coupled to the controller 12, and for helping to establish a proper storing sequence of video data.

As best seen in FIG. 5, the programmable pixel clock generator 47 is a conventional phase lock loop arrangement including a phase comparator 66, a low pass filter 67, a voltage controlled oscillator 68, and a programmable divider or divide by N counter 69. The programmable pixel clock generator 47 utilizes a reference clock signal coupled from the output of the analog multiplex unit 34. The reference signal is identified by the HSYNC signal and is coupled on a conductor 34D to the input of the phase comparator 66. An output pixel clock signal PXCLK for synchronizing the storing of the video data in the respective enhancing units 40, 42 and 44 is derived from the output of the voltage controlled oscillator 68. The sampling rate of the voltage controlled oscillator 68 is a function of the output of the programmable divider 69 as will be described hereinafter in greater detail.

Considering now the programmable divider 69 in greater detail with reference to FIG. 5, the programmable divider 69 is programmed by the microprocessor 36 to help establish a proper sampling rate for storing the video data. The following example will be instructive. Assuming the video standard coupled to the controller 12 is a NTSC standard requiring a sampling rate of 14.333 MHz or 910 samples for every line of display data. In this regard, a division of 910 is required to produce the desired sampling rate as shown by the following formula:

HSYNC rate (NTSC standard) ≈ 15.750 KHz

Sampling rate = 15.750 KHz × 910 = 14.333 MHz.

As will be explained hereinafter, 910 pixels are sampled per line, however 270 pixels of the 910 pixel samples represent excess data and is disregard. In this regard, if the video standard is VGA graphics, for example, a division of 800 is required to produce a sample rate of 25.175 MHz. In this regard, the HSYNC signal is 31.47 KHz multiplied by 800 to produce the desired sampling rate of 25.175 MHz. Again, a given number of the 800 samples represent excess data, i.e. 160 samples. These 160 samples are disregarded, the first 80 samples and the last 80 samples in every line.

Referring now to FIG. 9A, a horizontal synchronization signal (HSYNC DATA) is shown generally at 901. The pixel location disregard for storage purposes as described above are shown as a non-valid data group 902 immediately before the HSYNC DATA signal 901 goes to a logical high level and a non-valid data group 903 immediately after the HSYNC DATA signal 901 goes to a logical high level. The pixel locations between groups 902 and 903 represents a valid data group 904 for displaying on the panel 16. For the purpose of further explanation, the HORIZONTAL RETRACE period occurs when the HSYNC DATA signal 901 is a logical high.

Considering now the programmable counter arrangement 46 in greater detail with reference to FIG. 5, the programmable counter arrangement 46 generally comprises a retrace counter 73 for helping to establish the number of vertical retrace lines in a frame of displayed information, a pixel counter 75 for helping to establish the number of valid pixels in a single line of displayed information and for helping to establish the number of horizontal retrace pixels between lines of displayed information, a line counter 77 for helping to establish the number of valid lines in a frame of displayed information and a format processor or controller 79 for helping to coordinate the operation of the above mentioned counters in cooperation with the microprocessor 36.

The format processor or controller 79 under the control of the microprocessor 36 generates load signals LOAD R, LOAD P, and LOAD L which enables the loading of predetermined counts into the retrace counter 73, the pixel counter 75 and the line counter 77 for storing video data in each of the color enhancing units 40, 42 and 44 in a proper format for access and display on the display unit 16. The load signals, LOAD R, LOAD P and LOAD L are connected between the format controller 79 and the retrace counter, pixel counter 75 and line counter 77 on a set of conductors 79D, 79C and 79B respectively. A connector 36A connected between the microprocessor 36, the format controller 79, the programmable divider 69, and each of the above referenced counters 73, 75 and 75 allows command instructions and the predetermined formatting data to be transferred from the microprocessor 36 for establishing proper formatting.

In order to enable the format processor 79 to generate the necessary control signal for enabling the memory controller 50 to store the video information and control memory operations, each of the counters 73, 75 and 77 provide terminal count signals TCR, TCP, and TCL to the format processor 79. The terminal count signals are conducted to the processor 79 on conductors 73A, 75B and 77B espectively. The format processor 79 enables the memory controller 50 to store all even field lines of even memory addresses in the bit map memories and odd field lines at odd memory addresses. Storing video information in this manner, enables the video information to be retrieved from the bit map memories in each respective enhancing unit 40, 42 and 44 in a combined interlaced line format to generate the 480 vertical line resolution utilized by the display device 16.

C.1.1. Microprocessor Operation

In operation, the microprocessor 36 determines what video source is to be displayed and sends the proper divide by command to the programmable divider 69 via a command/data line signal on a conductor 36A. The operation of the microprocessor 36 will now be described in greater detail with reference to the flow diagram of FIG. 6 which illustrates the steps executed by the microprocessor 36.

Figure 6:
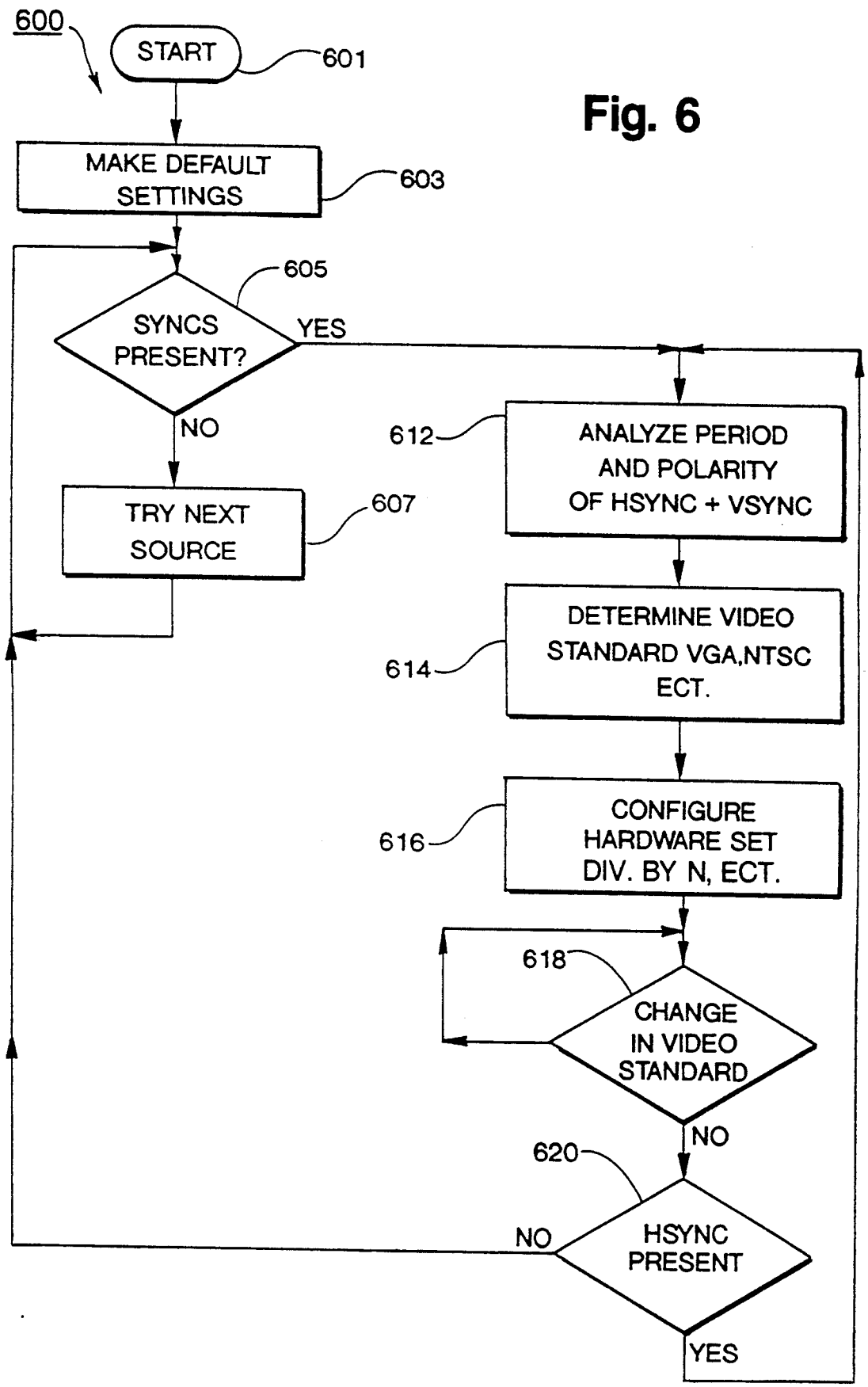
FIG. 6 is a flow diagram of the operation of the microprocessor of the display drive unit of FIG. 1.

Referring now to the flow chart of FIG. 6, when power is applied to the drive unit 11, a CONFIGURE PROGRAM 600 begins in a START instruction 601 and proceeds to an instruction box 603 to set the default settings for the preferred types of video signal source, i.e. NTSC, PAL, VGA GRAPHICS, etc. After the default settings have been established, the program proceeds to a decision instruction 605 in which a determination is made whether the microprocessor is currently receiving an HSYNC signal from the analog multiplex unit 34. If there is no signal being received, the program proceeds to instruction box 607 to cause the analog multiplex control signal MUX CONTROL to be switched allowing the HSYNC and VSYNC signal from another video signal source to be coupled to the microprocessor 36. After the MUX CONTROL signal has been enabled the program returns to decision 605 to once again determine whether an HSYNC is being received from the next selected or enabled source. The above described procedure repeats itself until an enabled video signal source begins sending video synchronization information (HSYNC, VSYNC).

If it is determined at decision instruction 605 that an HSYNC signal is present, the program branches to instruction 612 to cause the microprocessor 36 to analyze the period and polarity of the HSYNC and VSYNC signals respectively. After execution of instruction 612, the program proceeds to instruction 614 where the exact video signal standard is determined by the microprocessor 36 using a conventional comparing technique. Once the video signal standard is determined, the program steps to instruction 616 which configures the programmable divider 69 and programmable counter arrangement 46 by causing the proper sample rate and format count data to be set for formatting purposes. In this regard, the format processor 79 causes the LOAD R signal, LOAD P signal and LOAD L signal each to be enabled, as will be explained hereinafter in greater detail, so that the format data supplied by microprocessor 36 on line 36A can be loaded into each of the counters 73, 75 and 77. Once the programmable divider 69 and programmable counter arrangement 46 has been configured, the program proceeds to decision instruction 618 which determines whether a user has changed the video standard. If the video standard has not been changed, the program waits at instruction 618 until the video source is changed. When the video source is changed, the program proceeds to decision instruction 620 to determine whether the HSYNC signal is being received from the video source. If the HSYNC signal is present, the program goes to instruction 612 and proceeds as previously described. If a HSYNC signal is not present, the program will advance from instruction 620 to decision instruction 605 and proceed as previously described.

C.1.2. Operation of Format Timing Generator

Figure 7A:
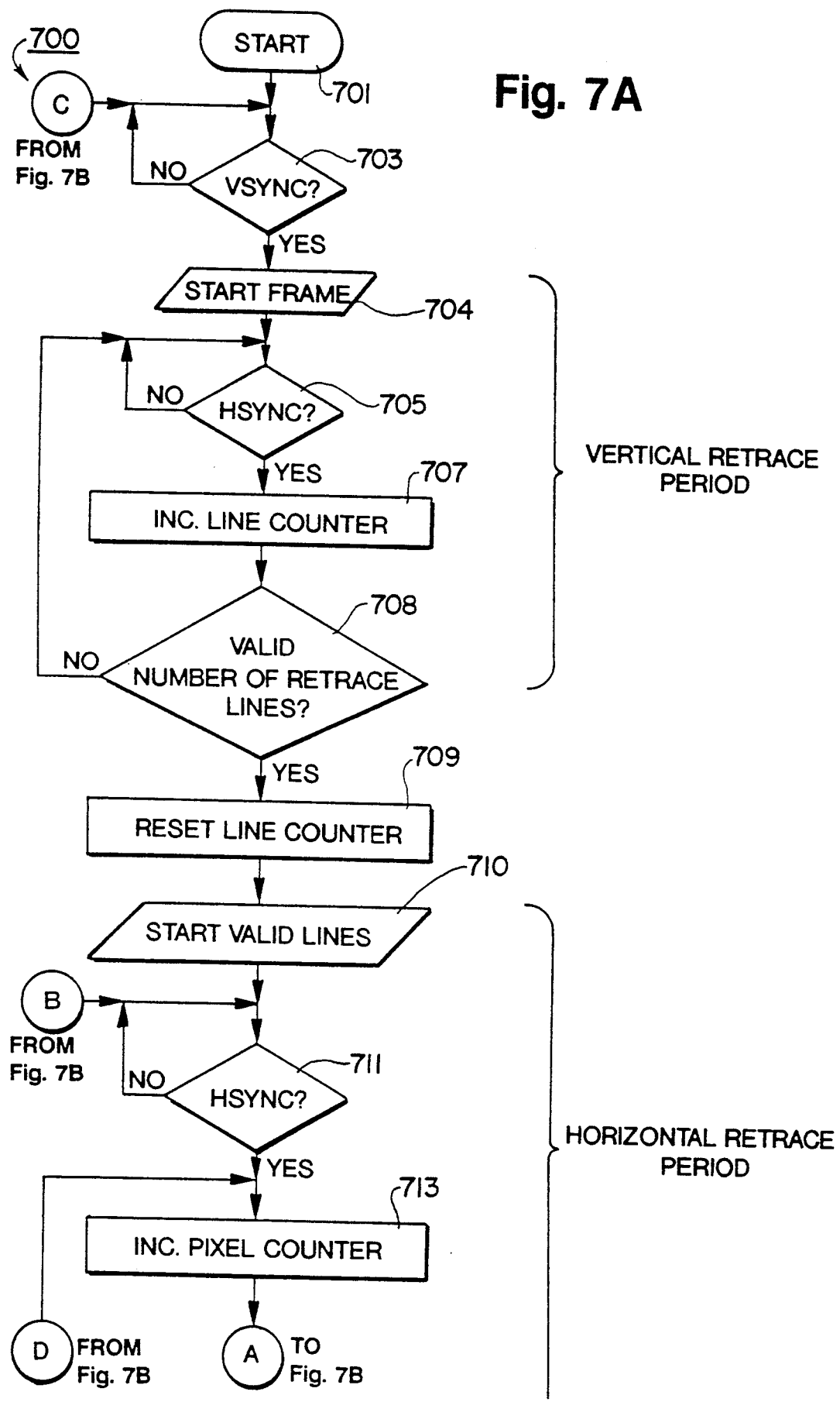
FIGS. 7A-B is a flow chart diagram of the operation of the format processor of the color enhancing controller of FIG. 3.
Figure 7B:
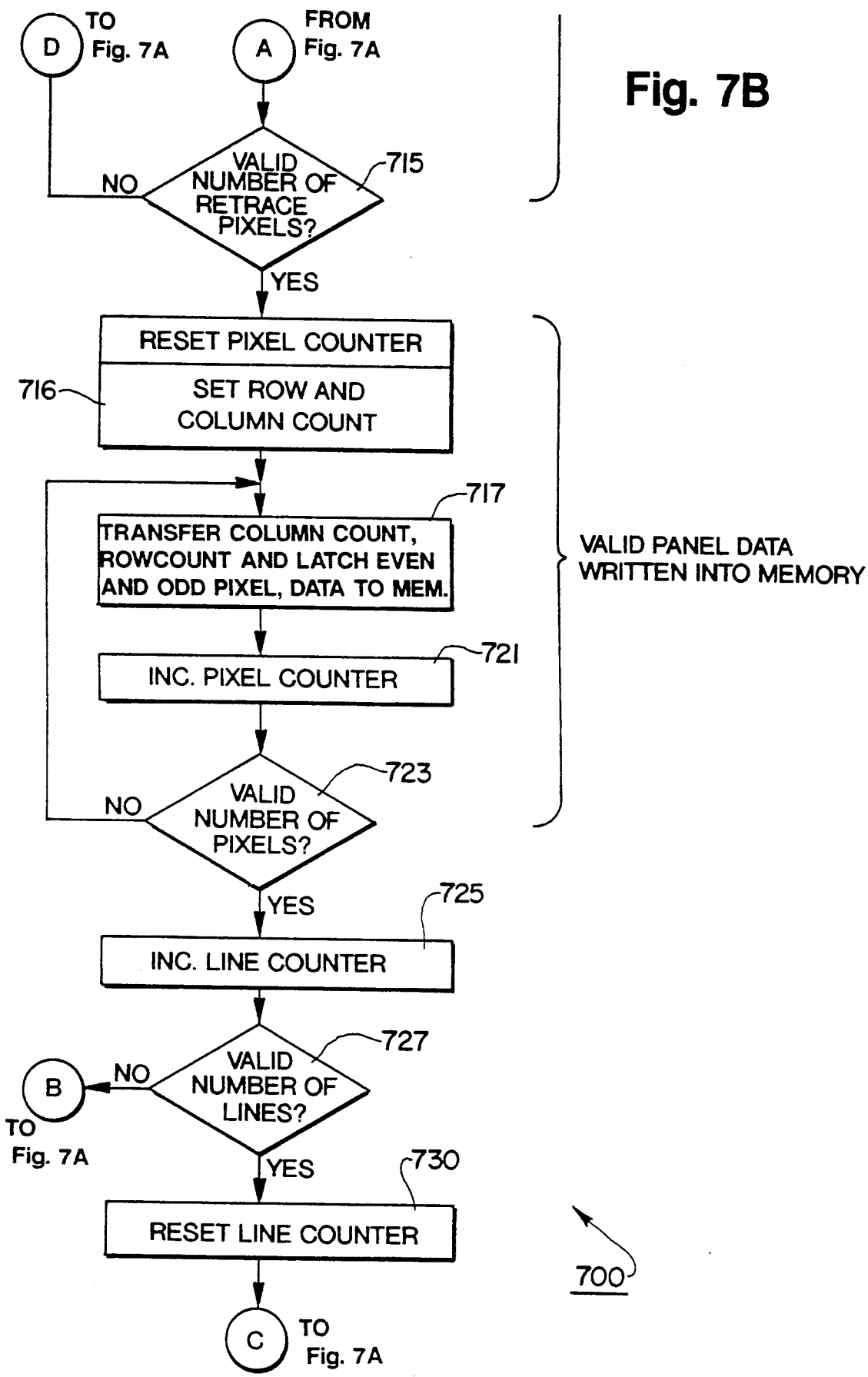
Figure 10:
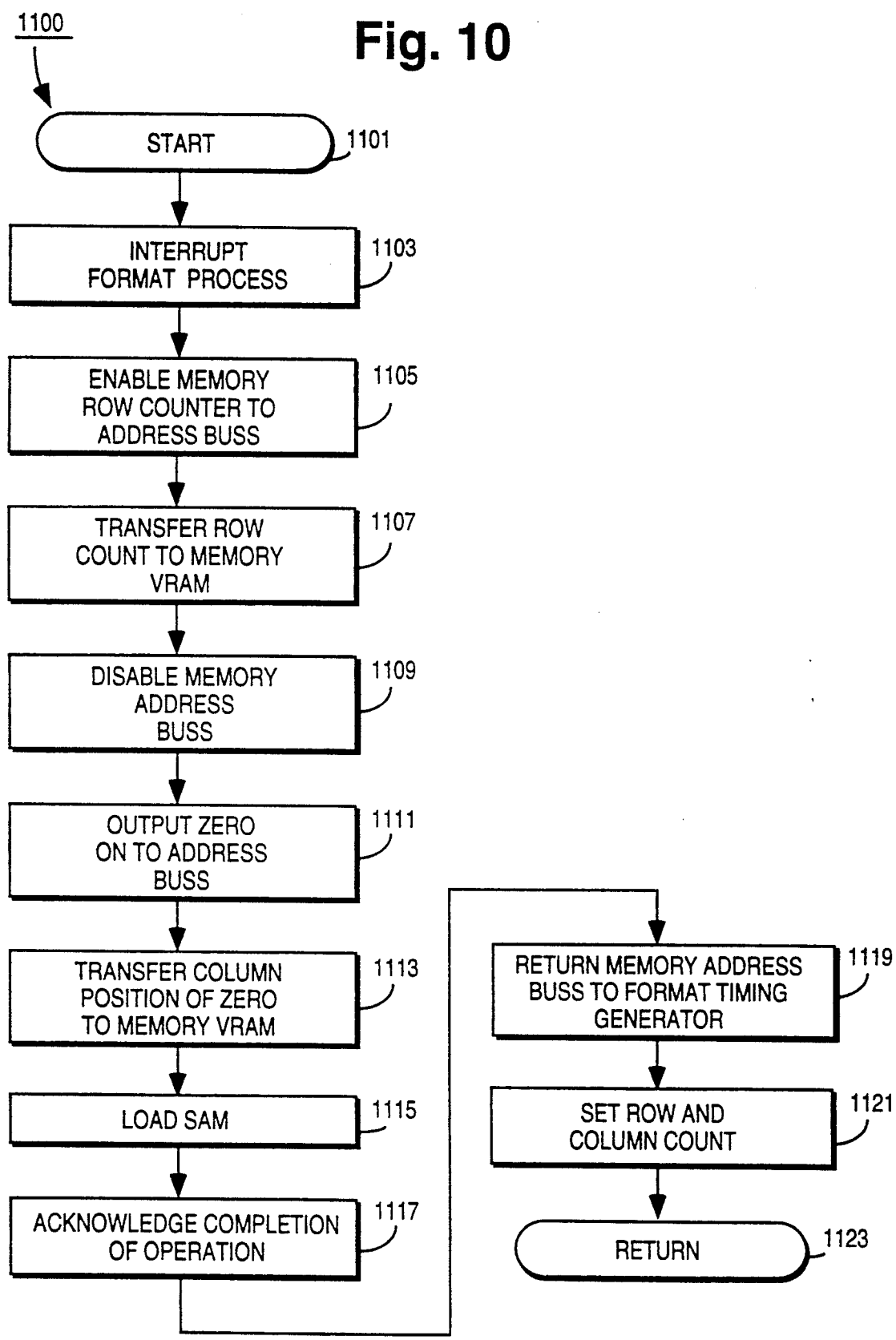
FIG. 10 is a flow chart diagram of the interrupt firmware of the color enhancing controller of FIG. 3.

Considering now the operation of the format controller 79 in greater detail with reference to FIG. 7A and 7B, in order for the format controller to properly control the formatting of video data for storage in the various bit map memories in the enhancing units 40, 42 and 44, the microprocessor 36 must first determine (1) the number of vertical retrace lines required for the displayed information; 2) the number of valid or displayable lines in any given frame of displayable information; 3) the number of horizontal retrace pixels between each displayable line of information; and 4) the total number of valid or displayable pixels in each line of displayable information. The microprocessor 36 is preprogrammed to determine the type of video source signal as a function of the HSYNC and VSYNC signal produced by the video source and then to generate the proper counter arrangement 46 data for storing in each of the respective counters 73, 75 and 77 to achieve proper formatting. Table II illustrates the base count information required for converting a VGA and a NTSC video source signal.

TABLE II

| COUNT REQUIREMENT | TYPE OF VIDEO SIGNAL SOURCE | |
|---|---|---|
| | VGA SOURCE | NTSC SOURCE |
| VERTICAL RETRACE LINES/FRAMES | 31 | 45 |
| DISPLAYABLE LINES IN FRAME | 480 | 480 |
| HORIZONTAL RETRACE PIXELS | 132 | 192 |
| DISPLAY PIXELS | 640 | 640 |

Once the mioroprocessor 36 has determined the type of video source signal, the microprocessor 36 sends formatting commands and format data for utilization by the counter arrangement 46.

Referring now to FIGS. 7, 7A, 7B, the format processor 79 upon receiving a configuration or format command starts a FORMAT program 700. The FORMAT program 700 begins in a START instruction 701 and processed to a decision instruction 703 to determine whether a VSYNC signal from the video source is present. If the VSYNC signal is not present, the program waits at decision instruction 703. When the VSYNC signal occurs, the program proceeds to an instruction box 704 to start a vertical retrace period or a new frame by resulting the time counter 77. The program then goes to decision box 705 to determine whether a HSYNC signal is present. If the HSYNC signal is not present the program waits at box 705. When an HSYNC signal occurs the program advances to instruction box 707 to cause the line counter 77 to be incremented. After the line counter 77 has been incremented, the program proceeds to a decision instruction 708 to determine whether a valid number of retrace line has occurred. If a valid number of retrace lines has not occurred, the program returns to decision box 705 and proceeds as previously described. In this regard, it should be understood that the first twenty two horizontal lines of data will be disregarded as best seen in FIGS. 8 and 9. If a valid number of retrace lines has occurred, the program advances to instruction 709 to reset the line counter 77. Once the line counter 77 has been reset, the program proceeds to instruction 710 to start a horizontal retrace period for generating the first valid line of the 480 lines to be stored. The program then advances to decision instruction 711 to wait for the next HSYNC signal. If the HSYNC signal is not present, the program waits at decision instruction 711. When the HSYNC signal occurs, the program advances to instruction 713 to increment the pixels counter 75. The program then proceeds, to decision instruction 715 (FIG. 7B) to determine whether a valid number of retrace pixels has occurred. If a valid number of retrace pixels has not occurred, the program returns to instruction 713 (FIG. 7A) and continues as previously described. If a valid number of retrace pixels has occurred, the program advances to instruction 716 to start storing valid video data into the bit map memories of the enhancing units 40, 42 and 44. In this regard, at instruction box 716 the pixel counter 75 is reset and the row and column count is set for utilization by the memory controller 50. After the row and column count has been set, and the pixel counter 75 reset, the program advances to instruction box 717 transfer the row and column count to the memory controller, enables the latching of the even and odd pixels and generates the memory control signals to enable the storing of data into the bit map memories. The control signals (such as the odd enable and even enable signals) for storing data int the individual bit map memories of enhancing units 40, 42, and 44 are more fully described in copending U.S. patent application Ser. No. 07/586,506. As will be explained hereinafter in greater detail, the memory control signals include an interrupt signal when generated by the video controller 18 whenever the video controller 18 requires access to the bit map memories in the enhancing units 40, 42 and 44. In this regard, the Request New Data signal generated by the video controller 18 cause the storing of data via the format timing generator 45 to be temporarily disabled while a line of displayable video data is read from the enhancing units 40, 42 and 44 for display purposes. The interrupt signal from the format timing generator 45 via the memory controller 50 and the memory control store data lines.

After the transfer of the data into memory, the program then proceeds to instruction 721 to increment the pixel counter 75. After the pixel counter 75 has been incremented the program advances to a decision instruction 723 to determine whether a valid number of pixels has been generated by the pixel counter 75. If a valid number has not occurred, the program returns to instruction 717 and repeats the above described sequence. When a valid number of pixels occurs, the program goes from decision instruction 723 to instruction box 725 to increment the line counter 77. After the line counter 77 has been incremented, the program advances to decision instruction 727 to determine whether a valid number of lines has occurred. If the frame is not completed, the program returns to decision instruction 711 (FIG. 7A) to start another line of information as previously described. If the frame is completed, the program goes to instruction 730 and reset the line counter 77. After counter 77 has been reset, the program returns to instruction 703 to wait for the next VSYNC signal.

From the foregoing, it should be understood that the format controller 79 in cooperation with the microprocessor 36 enables a conventional video signal such as a NTSC signal having 525 lines of horizontal video information to be formatted for display into 480 lines of horizontal video information as used by the display device 16. More particularly, the microprocessor 36 and controller 79 cause the 525 lines of horizontal information for each displayable frame of video information to be centered for display in the 640×480 pixel array of panel 16. In this regard, the first twenty two lines of horizontal data are blanked and the last twenty three lines of horizontal data are blanked so that only 480 lines of the horizontal information for each displayable frame of video information is displayed.

This is effective in practice since the majority of the disregarded horizontal lines consists of "overscan" or "invisible" lines and the extreme top and bottom of the displayable frame usually contains little or no displayable video information. For example, referring to FIG. 9B, a timing diagram is illustrated for horizontal line formatting. In this regard, a group of non-valid lines is shown generally at 910 and a group of valid lines are shown generally at 920. The group of non-valid lines 910 are disposed immediately before and immediately after the VSYNC signal goes to a logic high. The first 23 lines before the VSYNC signal and the first 22 lines after the VSYNC signal represent non-valid lines. The VSYNC signal is indicative of the vertical retrace lines. In a similar manner the width of the displayable frame of video information is matched to the 640 lines of the vertical information for each frame by adjusting the sampling rate of the video signal. The sampling or PXCLK rate is set, by setting a horizontal divisor (ratio of PXCLK to HSYNC rate) using the programmable divider 69 to match the horizontal frequency of the television signal produced by the video source. As the signals from the video drive module 26 already have a proper format, the above described formatting technique is not required. In this regard, the microprocessor 36 is coupled to the format timing generator 45 to select the desired format for the video drive module 26.

C.2. Memory Controller

Figure 11:
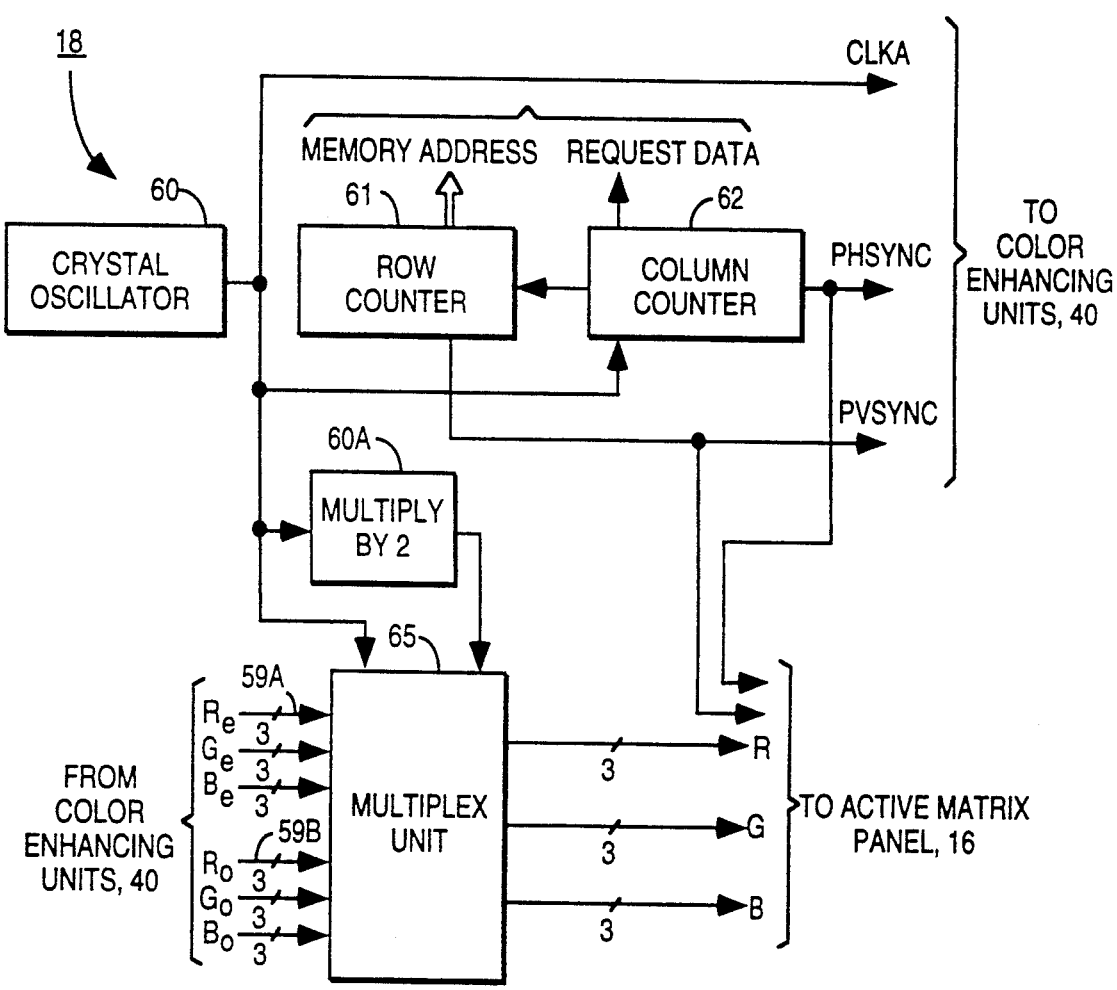
FIG. 11 is a block diagram of a video controller of FIG. 4.

Considering now the memory controller 50 in greater detail with reference to FIG. 11, the memory controller 50 controls the storing and reading of video data from each of the enhancing units 40, 42 and 44. In this regard, the memory controller 50 is more fully described in copending U.S. patent application Ser. No. 07/586,506 and will not be described hereinafter in greater detail except for the interrupting of the format processor 79 (FIG. 5) via an INTERRUPT firmware program 1100 whenever the bit memories of the enhancing units 40, 42 and 44 are accessed by the video controller 18.

C.3. Video Controller

Considering now the video controller 18 in greater detail with reference to FIG. 11, the video controller 18 includes a row counter 61 and a column counter 62 which generated the PHSYNC and PVSYNC signals used by the panel 16 as well as the memory address and request data signals used by the memory controller 50 to control the retrieval of the video data from the enhancing unit 40, 42 and 44. In this regard, whenever the row counter 61 reaches its terminal count, it generates the PVSYNC signal, and whenever the column counter 62 reaches its terminal count it generates the PHSYNC signal. The PHSYNC and PVSYNC signals are used by the panel 16 to control the display of video information.

The video controller 18 also includes an odd even multiplexer 65 and a firmware INTERRUPT program 1100. More particularly, as video data is loaded into each of the respective enhancing units 40, 42 and 44 on a line by line basis, it should be understood that cooperation is required between the format timing generator 45 and its formatting of data for storage into the enhancing units 40, 42 and 44, and the video controller 18 and its reading of the formatted data from the bit map memory in the enhancing units 40, 42 and 44. The above-mentioned cooperation or handshaking is accomplished through the INTERRUPT firmware program 1100.

The video controller 18 also includes a mode select multiplexer 111 for multiplexing data to the panel 16 from other color shading units (not shown). In this regard, the mode select multiplexer 111 in greater detail with reference to FIG. 5B, the mode select multiplexer 111 permits a user, via the infrared receiver 38 to select the format of video data to be displayed. In this regard, the system may display video data from either a television signal source mode or a computer video output signal source mode.

Considering now the INTERRUPT program 1100 in greater detail with reference to FIGS. 4 and 11, whenever the video controller 18 requires video data for display purposes, the video controller 18 generates an interrupt control signal on the request new data line buss between the video controller 18 and the memory controller 50. The interrupt control signal starts the INTERRUPT firmware program 1100. In this regard, the INTERRUPT firmware program 1100 starts at box 1101 and advances to instruction box 1103 which halts or interrupts the storing of data into the bit map memories of the enhancing units 40, 42 and 44. The program then advances to instruction box 1105 which enables the memory address lines from the row counter in the video controller 18 to be placed on the address buss for the enhancing units 40, 42 and 44. The address buss for the enhancing units 40, 42 and 44 is a common address buss shared by the format timing generator memory addressing and the video controller memory addressing.

After the memory address lines have been enabled, the memory controller 50 generates the RAS signal at instruction box 1107 transferring the row counter into the VRAMs or bit map memories of the enhancing units 40, 42 and 44. The program then advances to instruction box 1109 which disables the memory address buss from being controlled by video controller 18. The program then proceeds to instruction box 111 and outputs all zeros onto the address buss via the memory controller 50. The program then goes to instruction 1113 where the memory controller enables the CAS signal to cause the column position to be coupled to the bit map memories of the enhancing units 40, 42 and 44. The program then proceeds to instruction 1115 and loads the video data into the respective bit map memories in each enhancing unit 40, 42 and 44 for access by the video controller 18. In this regard, it should be understood that an entire row of video data is loaded into the respective bit map memories for display purposes. After the video data has been loaded into the bit map memories, the program advances to instruction 1117 to acknowledge that the loading of the memory has been completed which is indicative that a new line of data may now be displayed on the active matrix panel 16. More particularly, the PHSYNC produced by the column counter 62 is driven to a logical low level and remains low until the column counter 62 in the video controller 18 reaches its terminal count indicating that another new line of video data is required. When another line of data is required, another interrupt signal is generated. It should be understood that when the request new data signal is generated by the video controller 18, the PHSYNC goes to an active level.

After the acknowledgement of loading the bit map memories is completed, the program goes to instruction 1119 which returns control of the memory address buss to the format timing generator 45. The program then advances to instruction 1121 which enables the row and column count in the format timing generator 45 to be set as previously described. The program then proceeds to box 1123 which causes the FORMAT program 700 to be resumed from where it was interrupted.

D. DETAILED DESCRIPTION OF COLOR ENHANCING UNIT

D.1. Pattern Logic Unit

As best seen in FIG. 5A, the pattern reversal circuit 103, generally includes a set of dividers 104-106 for dividing the CLKA, PHSYNC, and PVSYNC signals by two, and a pair of exclusive OR gates 107, 109 for causing the 1×2 pattern logic to reverse patterns every other frame. Thus, by reversing each frame 15 levels of gray scale are achieved.

In order to transfer the digitized data from the analog to digital converter 51 to the scaling arrangement 52, the output signals (R7-R2) from the analog to digital converter 51 are coupled to the input buffer 102A on every PXCLK signal. The output signals (R7-R2) from the buffer 102A, in turn, are coupled to the inputs of the pattern logic unit 110.

Considering now the pattern logic unit 110 in greater detail, with reference to FIG. 5A and Table III, the pattern logic unit 59 comprises a XILINX unit programmed to produce weighted pixel intensities levels according to the truth table shown in Table III. In this regard, the pattern logic unit 110 is coupled between the analog to digital converter 51 and the bit map memory 57 for processing the data stored in the bit map memory 57 to increase the number of displayable shading levels of the red component of video data from 8 levels to 57 levels. More particularly, the pattern logic unit 110 gray scales the intensity level of individual pixels elements in specific pixel element groupings to generate weighted intensity level pixels. In this regard, the 2×2 pattern logic unit 110 compares each six bits of data retrieved from the analog to digital converter 51 relative to an array group or grouping of four pixel elements such a pattern group (FIG. 12) to effectively quantize or establish the intensity levels for a single composite panel pixel, such as the panel pixel 300 (FIG. 12).

Because of such quantizing, it can best be seen in FIGS. 12 that a pattern array is established in the pixel groupings, to define composite pixel groups, such as groups 300-305 (FIG. 12). Each composite group consists of four pixel elements. As will be explained hereinafter in greater detail, the pattern logic 59 will selectively energize one or more of the pixel elements in each composite group, such as composite group 300, to form a composite pixel image. It should be understood however, that any one or all of the four possible pixel elements, such as pixel elements 230, 225, 230 and 231 may be active in one of the grouping, such as the grouping 300. However, as the human eye is incapable of distinguishing the individual pixel elements in the rows and columns from one another, the grouping of pixel elements are utilized to define the single composite panel pixel image having in excess of one hundred and eighty-five thousand different shading levels. Stated otherwise, the selectively activated pixel elements 220, 225, 234 and 231 are combined to form a weighted intensity level of 57 different levels for the red component (as well as the blue and green components) of a given composite panel pixel, such as the panel pixel 300. In a similar manner, other pixel elements such as pixel elements 221, 227, 232 and 223 are also combined to form other composite panel pixels, such as the composite pixel 302.

From the foregoing it should be understood that although the liquid crystal panel 16 normally provides only 8 shades for each of the principal primary colors of red, green and blue, the pattern logic 59 and 110 cooperate together to enable the combining of video pixel element signals so that in excess of 185 thousand possible color shading combinations for each composite pixel in the active matrix panel 16 is made possible.

D.1.1. Pattern Logic Equations and Truth Table

Figure 13:
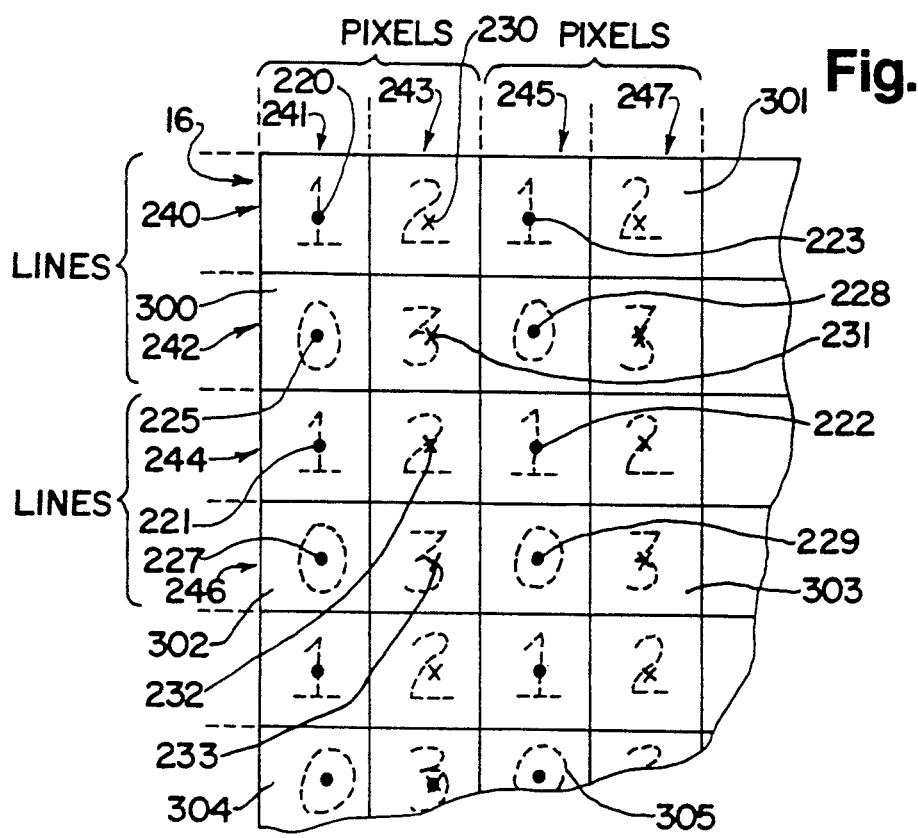
FIG. 13 is another diagrammatic representation of a group of pixel elements within the active matrix panel 16 of FIG. 4, illustrating a phase reversal.

Considering now the pattern logic 110 in greater detail with reference to FIGS. 12 and 13, as each panel pixel element is addressed, such as the panel pixel element 220, a pair of location signals (PIXEL and LINE) are generated by a quadrant circuit 111. In this regard, the signals PIXEL and LINE are indicative of a quadrant location 0, 1, 2 or 3, for the addressed panel pixel element in a given composite pixel grouping, such as the grouping 300. In this regard, the grouping 300 is configured in a 2×2 matrix array of rows (LINE) and columns (PIXEL) having four quadrant locations 0, 1, 2 and 3.

Considering now the quadrant circuit 111 in greater detail with reference to FIG. 5B, the quadrant circuit 111 generally includes a divide by two divider 103 which effectively halves the pixel clock rate for use by the 2×2 pattern logic unit 110. The divider 103 is reset on every HSYNC time.

The quadrant circuit 111 further includes another divide by two divider 108 which effectively halves the HSYNC rate. The divider 108 is reset on every VSYNC signal.

The quadrant circuit 111 also includes a multiplexer unit 112 whose output signal LINE is controlled via a control signal MODE generated by the microprocessor 36. The multiplex 112 has two input signals either the output of divider 108 or the ODD FIELD signal generated by the signal converter 32.

From the foregoing, it should be understood either the output signal from the divider 108 or the ODD FIELD signal from the signal converter 32 will be gated to the 2×2 pattern logic unit 110 via the multiplexer 112. In this regard, a t.v. mode select signal on conductor 36C controls the multiplexer 112.

The location signals are then logically combined in the pattern logic 110 with the quantized data retrieved from the analog to digital converter 51, identified as R7, R6, R5, R4, R3 and R2, (Table III) according to the following equations:

$$!pd3 = (\overline{R_7} \cdot \overline{\text{line}} \cdot \text{pixel} + \overline{R_2} \cdot \overline{R_7} \cdot \overline{\text{line}} +$$

$$\overline{R_3} \cdot \overline{R_7} \cdot \text{pixel} + \overline{R_3} \cdot \overline{R_7} \cdot \overline{\text{line}} +$$

$$\overline{R_2} \cdot \overline{R_3} \cdot \overline{R_7} + \overline{R_4} \cdot \overline{R_7} + \overline{R_5} \cdot \overline{R_7} + \overline{R_6} \cdot \overline{R_7})$$

$$!pd2 = (\overline{R_2} \cdot \overline{R_6} \cdot \overline{\text{line}} + \overline{R_3} \cdot \overline{R_6} \cdot \text{pixel} + \overline{R_3} \cdot \overline{R_6} \cdot \overline{\text{line}} +$$

$$\overline{R_2} \cdot \overline{R_3} \cdot \overline{R_6} + \overline{R_4} \cdot \overline{R_6} + R_2 \cdot R_3 \cdot R_4 \cdot R_5 \cdot R_6 \cdot \overline{R_7} \cdot \overline{\text{pixel}} +$$

$$R_3 \cdot R_4 \cdot R_5 \cdot R_6 \cdot \overline{R_7} \cdot \text{line} +$$

$$R_2 \cdot R_4 \cdot R_5 \cdot R_6 \cdot \overline{R_7} \cdot \text{line} \cdot$$

$$\overline{\text{pixel}} + \overline{R_6} \cdot \overline{\text{line}} \cdot \text{pixel} + \overline{R_5} \cdot \overline{R_6})$$

$$!pd1 = \overline{R_2} \cdot \overline{R_5} \cdot \overline{\text{line}} + \overline{R_3} \cdot \overline{R_5} \cdot \text{pixel} + \overline{R_3} \cdot \overline{R_5} \cdot \overline{\text{line}} +$$

$$\overline{R_2}\, \overline{R_3} \cdot \overline{R_5} + R_2 \cdot R_3 \cdot R_4 \cdot R_5 \cdot \overline{R_6} \cdot \overline{\text{pixel}} +$$

$$R_2 \cdot R_4 \cdot R_5 \cdot \overline{R_6} \cdot \text{line} \cdot \overline{\text{pixel}} +$$

$$R_3 \cdot R_4 \cdot R_5 \cdot \overline{R_7} \cdot \text{line} +$$

$$R_2 \cdot R_4 \cdot R_5 \cdot \overline{R_7} \cdot \text{line} \cdot \overline{\text{pixel}} + \overline{R_5} \cdot \overline{\text{line}} \cdot \text{pixel} +$$

$$R_2 \cdot R_3 \cdot R_4 \cdot R_5 \cdot \overline{R_7} \cdot \overline{\text{pixel}} + R_3 \cdot R_4 \cdot$$

$$R_5 \cdot \overline{R_6} \cdot \text{line} + \overline{R_4} \cdot \overline{R_5})$$

$$!pd0 = (\overline{R_3} \cdot \overline{R_4} \cdot \text{pixel} + \overline{R_3} \cdot \overline{R_4} \cdot \overline{\text{line}} +$$

$$R_2 \cdot R_3 \cdot R_4 \cdot \overline{R_5} \cdot \overline{\text{pixel}} +$$

$$R_2 \cdot R_4 \cdot \overline{R_5} \cdot \text{line} \cdot \overline{\text{pixel}} + R_2 \cdot R_3 \cdot R_4 \cdot \overline{R_6} \cdot \overline{\text{pixel}} +$$

$$R_3 \cdot R_4 \cdot \overline{R_6} \cdot \text{line} +$$

$$R_2 \cdot R_4 \cdot \overline{R_6} \cdot \text{line} \cdot \overline{\text{pixel}} + R_3 \cdot R_4 \cdot \overline{R_7} \cdot \text{line} +$$

$$R_2 \cdot R_4 \cdot \overline{R_7} \cdot \text{line} \cdot \overline{\text{pixel}} + \overline{R_4} \cdot \overline{\text{line}} \cdot \text{pixel} +$$

$$R_2 \cdot R_3 \cdot R_4 \cdot \overline{R_7} \cdot \overline{\text{pixel}} +$$

$$R_3 \cdot R_4 \cdot \overline{R_5} \cdot \text{line} + \overline{R_2} \cdot \overline{R_4} \cdot \overline{\text{line}} + \overline{R_2} \cdot \overline{R_3} \cdot \overline{R_4})$$

where the signals !pd3, !pd2, !pd1, and !pd0 are indicative of the 4 bit red component signals R3*-R0* respectively. The intensity of the color emitted from each panel pixel element, such as a panel pixel element 220, is thus dependent upon each four bits of data retrieved from the bit map memory 57, identified as input data i3, i2, i1 and i0, combined with the ODD and MODE OF DISPLAY signals. It should be understood the MODE OF DISPLAY signal is generated by the microprocessor 36 on a function of EGA/VGA modes.

Considering now the Table III in greater detail, Table III is a truth table which represents the operation of the pattern logic unit 110. The truth table comprises three columns, an input data column, a location data column, and an output data column. It should be noted that the data in the truth table is given in base 10 representation rather than base 2.

The following examples are designed to illustrate how the truth table functions.

EXAMPLE 1

The input bits R7, R6, R5, R4, R3 and R2 are $00000_2$ or $0_{10}$. The PIXEL and LINE bits are $00_2$ or $0_{10}$. With these bits as input data, the pattern logic unit 110 computes the output data, pd3, pd2, pd1 and pd0 according to the equations given above. In this example, the output bits are $000_2$ or $0_{10}$, as shown in column three of the truth table. Note that in this example, where the input bits R7, R6, R5, R4, R3 and R2 are $00000_2$ or $0_{10}$, the output bits will always be $0_{10}$, the output bits will always be $0_{10}$, no matter what the value of PIXEL and LINE may be.

EXAMPLE 2

The input bits R7, R6, R5, R4, R3 and R2 are $01101_2$ or $13_{10}$. The PIXEL and LINE bits are $00_2$ or $0_{10}$. From column three, output data, of the truth table the output bits pd3, pd2, pd1, and pd0 are determined to be $011_2$ or $3_{10}$.

EXAMPLE 3

The input bits R7, R6, R5, R4, R3 and R2 are $01101_2$ or $13_{10}$ as in EXAMPLE 2. However, PIXEL and LINE bits have a value of $11_2$ or $3_{10}$. The output bits pd3, pd2, pd1, and pd0 are determined to be $011_2$ or $3_{10}$.

EXAMPLE 4

The inputs bits R7, R6, R5, R4, R3 and R2 are $10100_2$ or $20_{10}$. As in EXAMPLE 1, the value of the output bits pd3, pd2, pd1, and pd0 in this example are not dependent upon the value of the PIXEL and LINE bits. In this EXAMPLE the output will be $101_2$ or $5_{10}$ regardless of the value of PIXEL and LINE.

Using the above examples as guides, one skilled in the art will be able to determine the value of all the possible output data bits pd3, pd2, pd1, and pd0 which establishes the intensity level of each of the color components for any given panel pixel element, such as the panel pixel element 120, based upon the input data bits R7, R6, R5, R4, R3 and R2 PIXEL and LINE.

TABLE III

PATTERN LOGIC UNIT 110
TRUTH TABLE

| INPUT DATA (R7, R6, R5, R4, R3, R2) | LOCATION (pixel, line) | OUTPUT DATA (pd3, pd2, pd1, pd0) |
|---|---|---|
| 0 | 0 | 0 |
| 0 | 1 | 0 |
| 0 | 2 | 0 |
| 0 | 3 | 0 |
| 1 | 0 | 0 |
| 1 | 1 | 1 |
| 1 | 2 | 0 |
| 1 | 3 | 0 |
| 2 | 0 | 0 |
| 2 | 1 | 1 |
| 2 | 2 | 0 |
| 2 | 3 | 1 |
| 3 | 0 | 1 |
| 3 | 1 | 1 |
| 3 | 2 | 0 |
| 3 | 3 | 1 |
| 4 | 0 | 1 |
| 4 | 1 | 1 |
| 4 | 2 | 1 |
| 4 | 3 | 1 |
| 5 | 0 | 1 |
| 5 | 1 | 2 |
| 5 | 3 | 1 |
| 6 | 1 | 2 |
| 6 | 2 | 1 |
| 6 | 3 | 2 |
| 7 | 0 | 2 |
| 7 | 1 | 2 |
| 7 | 2 | 1 |
| 7 | 3 | 2 |
| 8 | 0 | 2 |
| 8 | 1 | 2 |
| 8 | 2 | 2 |
| 8 | 3 | 2 |
| 9 | 0 | 2 |
| 9 | 1 | 3 |
| 9 | 2 | 2 |
| 9 | 3 | 2 |
| 10 | 0 | 2 |

TABLE III-continued

PATTERN LOGIC UNIT 110
TRUTH TABLE

| INPUT DATA (R7, R6, R5, R4, R3, R2) | LOCATION (pixel, line) | OUTPUT DATA (pd3, pd2, pd1, pd0) |
|---|---|---|
| 10 | 1 | 3 |
| 10 | 2 | 2 |
| 10 | 3 | 3 |
| 11 | 0 | 3 |
| 11 | 1 | 3 |
| 11 | 2 | 2 |
| 11 | 3 | 3 |
| 12 | 0 | 3 |
| 12 | 1 | 3 |
| 12 | 2 | 3 |
| 12 | 3 | 3 |
| 13 | 0 | 3 |
| 13 | 1 | 4 |
| 13 | 2 | 3 |
| 13 | 3 | 3 |
| 14 | 0 | 3 |
| 14 | 1 | 4 |
| 14 | 2 | 3 |
| 14 | 3 | 4 |
| 15 | 0 | 4 |
| 15 | 1 | 4 |
| 15 | 2 | 3 |
| 15 | 3 | 4 |
| 16 | 0 | 4 |
| 16 | 1 | 4 |
| 16 | 2 | 4 |
| 16 | 3 | 4 |
| 17 | 0 | 4 |
| 17 | 1 | 5 |
| 17 | 2 | 4 |
| 17 | 3 | 4 |
| 18 | 0 | 4 |
| 18 | 1 | 5 |
| 18 | 2 | 4 |
| 18 | 3 | 5 |
| 19 | 0 | 5 |
| 19 | 1 | 5 |
| 19 | 2 | 4 |
| 19 | 3 | 5 |
| 20 | 0 | 5 |
| 20 | 1 | 5 |
| 20 | 2 | 5 |
| 20 | 3 | 5 |
| 21 | 0 | 5 |
| 21 | 1 | 6 |
| 21 | 2 | 5 |
| 21 | 3 | 5 |
| 22 | 0 | 5 |
| 22 | 1 | 6 |
| 22 | 2 | 5 |
| 22 | 3 | 6 |
| 23 | 0 | 6 |
| 23 | 1 | 6 |
| 23 | 2 | 5 |
| 23 | 3 | 6 |
| 24 | 0 | 6 |
| 24 | 1 | 6 |
| 24 | 2 | 6 |
| 24 | 3 | 6 |
| 25 | 0 | 6 |
| 25 | 1 | 7 |
| 25 | 2 | 6 |
| 25 | 3 | 6 |
| 26 | 0 | 6 |
| 26 | 1 | 7 |
| 26 | 2 | 6 |
| 26 | 3 | 7 |
| 27 | 0 | 7 |
| 27 | 1 | 7 |
| 27 | 2 | 6 |
| 27 | 3 | 7 |
| 28 | 0 | 7 |
| 28 | 1 | 7 |
| 28 | 2 | 7 |
| 28 | 3 | 7 |
| 29 | 0 | 7 |

TABLE III-continued
PATTERN LOGIC UNIT 110 TRUTH TABLE

| INPUT DATA (R7, R6, R5, R4, R3, R2) | LOCATION (pixel, line) | OUTPUT DATA (pd3, pd2, pd1, pd0) |
|---|---|---|
| 29 | 1 | 7 |
| 29 | 2 | 7 |
| 29 | 3 | 7 |
| 30 | 0 | 7 |
| 30 | 1 | 7 |
| 30 | 2 | 7 |
| 30 | 3 | 7 |
| 31 | 0 | 7 |
| 31 | 1 | 7 |
| 31 | 2 | 7 |
| 31 | 3 | 7 |
| 32 | 0 | 8 |
| 32 | 1 | 8 |
| 32 | 2 | 8 |
| 32 | 3 | 8 |
| 33 | 0 | 8 |
| 33 | 1 | 9 |
| 33 | 2 | 8 |
| 33 | 3 | 8 |
| 34 | 0 | 8 |
| 34 | 1 | 9 |
| 34 | 2 | 8 |
| 34 | 3 | 9 |
| 35 | 0 | 9 |
| 35 | 1 | 9 |
| 35 | 2 | 8 |
| 35 | 3 | 9 |
| 36 | 0 | 9 |
| 36 | 1 | 9 |
| 36 | 2 | 9 |
| 36 | 3 | 9 |
| 37 | 0 | 9 |
| 37 | 1 | 10 |
| 37 | 2 | 9 |
| 37 | 3 | 9 |
| 38 | 0 | 9 |
| 38 | 1 | 10 |
| 38 | 2 | 9 |
| 38 | 3 | 10 |
| 39 | 0 | 10 |
| 39 | 1 | 10 |
| 39 | 2 | 9 |
| 39 | 3 | 10 |
| 40 | 0 | 10 |
| 40 | 1 | 10 |
| 40 | 2 | 10 |
| 40 | 3 | 10 |
| 41 | 0 | 10 |
| 41 | 1 | 11 |
| 41 | 2 | 10 |
| 41 | 3 | 10 |
| 42 | 0 | 10 |
| 42 | 1 | 11 |
| 42 | 2 | 11 |
| 42 | 3 | 11 |
| 43 | 0 | 11 |
| 43 | 1 | 11 |
| 43 | 2 | 10 |
| 43 | 3 | 11 |
| 44 | 0 | 11 |
| 44 | 1 | 11 |
| 44 | 2 | 11 |
| 44 | 3 | 11 |
| 45 | 0 | 11 |
| 45 | 1 | 12 |
| 45 | 2 | 11 |
| 45 | 3 | 11 |
| 46 | 0 | 11 |
| 46 | 1 | 12 |
| 46 | 2 | 11 |
| 46 | 3 | 12 |
| 47 | 0 | 12 |
| 47 | 1 | 12 |
| 47 | 2 | 11 |
| 47 | 3 | 12 |
| 48 | 0 | 12 |
| 48 | 1 | 12 |
| 48 | 2 | 12 |
| 48 | 3 | 12 |
| 49 | 0 | 12 |
| 49 | 1 | 13 |
| 49 | 2 | 12 |
| 49 | 3 | 12 |
| 50 | 0 | 12 |
| 50 | 1 | 13 |
| 50 | 2 | 12 |
| 50 | 3 | 13 |
| 51 | 0 | 13 |
| 51 | 1 | 13 |
| 51 | 2 | 12 |
| 51 | 3 | 13 |
| 52 | 0 | 13 |
| 52 | 1 | 13 |
| 52 | 2 | 13 |
| 52 | 3 | 13 |
| 53 | 0 | 13 |
| 53 | 1 | 14 |
| 53 | 2 | 13 |
| 53 | 3 | 13 |
| 54 | 0 | 13 |
| 54 | 1 | 14 |
| 54 | 2 | 13 |
| 54 | 3 | 14 |
| 55 | 0 | 14 |
| 55 | 1 | 14 |
| 55 | 2 | 13 |
| 55 | 3 | 14 |
| 56 | 0 | 14 |
| 56 | 1 | 14 |
| 56 | 2 | 14 |
| 56 | 3 | 14 |
| 57 | 0 | 14 |
| 57 | 1 | 15 |
| 57 | 2 | 14 |
| 57 | 3 | 14 |
| 58 | 0 | 14 |
| 58 | 1 | 15 |
| 58 | 2 | 14 |
| 58 | 3 | 15 |
| 59 | 0 | 15 |
| 59 | 1 | 15 |
| 59 | 2 | 14 |
| 59 | 3 | 15 |
| 60 | 0 | 15 |
| 60 | 1 | 15 |
| 60 | 2 | 15 |
| 60 | 3 | 15 |
| 61 | 0 | 15 |
| 61 | 1 | 15 |
| 61 | 2 | 15 |
| 61 | 3 | 15 |
| 62 | 0 | 15 |
| 62 | 1 | 15 |
| 62 | 2 | 15 |
| 62 | 3 | 15 |
| 63 | 0 | 15 |
| 63 | 1 | 15 |
| 63 | 2 | 15 |
| 63 | 3 | 15 |

D.2. 1×2 Pattern Logic Unit

Considering now the 1×2 pattern logic unit 59 in greater detail, the pattern logic unit 59 retrieves the data stored in the bit map memory unit 57 and quantizes each 4-bit byte to complete formation of each high color resolution composite pixel. In this regard, the each 4-bits of data is quantizes into one of the panels 8 shading levels in accordance with Table IV.

The signal MODE OF DISPLAY is utilized to group the 16 possible input shading levels into sets of 4 levels each. The MODE signal is indicative of the color mode employed by the video producing source; i.e. whether an EGA color mode or a CGA color mode. In this regard, the EGA and CGA color mode only use $i_3$ and $i_2$ while the VGA mode utilizes all four-bits $i_3$, $i_2$, $i_1$ and $i_0$.

D.2.1. 1×2 Pattern Logic Equations and Truth Table

The quantized data as illustrated in Table IV is derived from the following equations:

$$!rp2 = \overline{(\overline{i_0} \cdot \overline{i_1} \cdot \overline{i_2} \cdot \overline{odd} \cdot \overline{mode} + \overline{i_3})}$$

$$!rp1 = /\overline{(\overline{i_2} \cdot mode + \overline{i_0} \cdot \overline{i_1} \cdot \overline{i_2} \cdot \overline{odd} \cdot \overline{mode} + i_1 \cdot \overline{i_2} + i_0 \cdot \overline{i_2} + \overline{i_2} \cdot odd + \overline{i_2} \cdot \overline{i_3})}$$

$$rp0 = /\overline{(\overline{i_2} \cdot \overline{i_3} \cdot mode + \overline{i_1} \cdot odd \cdot \overline{mode} + \overline{i_0} \cdot i_1 \cdot \overline{odd} \cdot \overline{mode} + i_0 \cdot \overline{i_1} \cdot \overline{mode} + \overline{i_1} \cdot \overline{i_2} \cdot \overline{i_3})}$$

TABLE IV

| INPUT DATA | ODD | MODE | OUTPUT DATA rp1, rp2, rp3 |
|---|---|---|---|
| 0000 | 0 | 0 | 000 |
| 0000 | 1 | 0 | 000 |
| 0001 | 0 | 0 | 000 |
| 0001 | 1 | 0 | 000 |
| 0010 | 0 | 0 | 000 |
| 0010 | 1 | 0 | 001 |
| 0011 | 0 | 0 | 001 |
| 0011 | 1 | 0 | 001 |
| 0100 | 0 | 0 | 001 |
| 0100 | 1 | 0 | 010 |
| 0101 | 0 | 0 | 010 |
| 0101 | 1 | 0 | 010 |
| 0110 | 0 | 0 | 010 |
| 0110 | 1 | 0 | 011 |
| 0111 | 0 | 0 | 011 |
| 0111 | 1 | 0 | 011 |
| 1000 | 1 | 0 | 100 |
| 1001 | 0 | 0 | 100 |
| 1001 | 1 | 0 | 100 |
| 1010 | 0 | 0 | 100 |
| 1010 | 1 | 0 | 101 |
| 1011 | 0 | 0 | 101 |
| 1011 | 1 | 0 | 101 |
| 1100 | 0 | 0 | 101 |
| 1100 | 1 | 0 | 110 |
| 1101 | 0 | 0 | 110 |
| 1101 | 1 | 0 | 110 |
| 1110 | 0 | 0 | 110 |
| 1110 | 1 | 0 | 111 |
| 1111 | 0 | 0 | 111 |
| 1111 | 1 | 0 | 111 |
| 0000 | 0 | 1 | 000 |
| 0000 | 1 | 1 | 000 |
| 0001 | 0 | 1 | 000 |
| 0001 | 1 | 1 | 000 |
| 0010 | 0 | 1 | 000 |
| 0010 | 1 | 1 | 000 |
| 0011 | 0 | 1 | 000 |
| 0011 | 1 | 1 | 000 |
| 0100 | 0 | 1 | 011 |
| 0100 | 1 | 1 | 011 |
| 0101 | 0 | 1 | 011 |
| 0101 | 1 | 1 | 011 |
| 0110 | 0 | 1 | 011 |
| 0110 | 1 | 1 | 011 |
| 0111 | 0 | 1 | 011 |
| 0111 | 1 | 1 | 011 |
| 1000 | 0 | 1 | 101 |
| 1000 | 1 | 1 | 101 |
| 1001 | 0 | 1 | 101 |
| 1001 | 1 | 1 | 101 |
| 1010 | 0 | 1 | 101 |
| 1010 | 1 | 1 | 101 |

TABLE IV-continued

| INPUT DATA | ODD | MODE | OUTPUT DATA rp1, rp2, rp3 |
|---|---|---|---|
| 1011 | 0 | 1 | 101 |
| 1011 | 1 | 1 | 101 |
| 1100 | 0 | 1 | 111 |
| 1100 | 1 | 1 | 111 |
| 1101 | 0 | 1 | 111 |
| 1101 | 1 | 1 | 111 |
| 1110 | 0 | 1 | 111 |
| 1110 | 1 | 1 | 111 |
| 1111 | 0 | 1 | 111 |
| 1111 | 1 | 1 | 111 |

From Tables III and IV it should be understood that each one of the composite pixel cells in the composite pixel formed via the 2×2 pattern logic 110 can have up to 15 unique values which are defined in general by equation 1, where equation 1 is:

$$\text{Number of colors per color component} = \frac{(\text{\# of cell colors} - 1)}{} \times \text{\# of cells} + 1 \quad (1)$$

Thus, for the 2×2 logic pattern unit 110 we find from equation 1 the following:

$$(15-1) \times 4 + 1 = 57 \text{ levels}$$

Similarly, for the 1×2 logic pattern unit 59 we find from equation 1 the following:

$$(8-1) \times 2 + 1 = 15 \text{ levels}$$

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A scaling arrangement for enhancing the number of color shading levels exhibited by a display device in response to a computer generated video signal, said display device having a matrix of pixel elements arranged in groups to define a plurality of composite pixels, each individual pixel element having a group of subpixel elements with each subpixel element producing at least N shading levels of an individual color in response to said computer generated video signal, comprising:

signal conversion means responsive to the computer generated video signal for converting the computer generated video signal into a plurality of groups of X digital signals, each group of X digital signals being indicative of at least M shading levels where M is substantially larger than N;

means responsive to said plurality of groups of X digital signals for converting each individual group of X digital signals into a plurality of groups of Y signals where Y is substantially smaller than X;

quantizing means responsive to said plurality of groups of Y signals for converting said plurality of groups of Y signals into a plurality of groups of Z sub-pixel shading level signals each group of Z shading level signals being indicative of M/4 shading levels;

pattern means for assigning individual ones of said groups of Z sub-pixel shading level signals to individual ones of sub-pixel elements in a specific quadrant on one of the composite pixels in the plurality of composite pixels;

sub-pixel energizing means for converting said Z shading level signals into groups of energizing signals for driving individual ones of the sub-pixel elements so that each composite pixel can exhibit substantially M shading levels of individual ones of a plurality of individual colors; and pattern reversal means for changing every frame the quadrant assignments of individual ones of said group of Z sub-pixel shading level signals to cause individual pixel elements to be gray scaled.

2. A scaling arrangement as recited in claim 1, wherein the display device is a liquid crystal display device.

3. A scaling arrangement as recited in claim 2, wherein said liquid crystal display device is an active matrix thin film transistor liquid crystal display panel.

4. A scaling arrangement as recited in claim 3, wherein each group of said subpixel elements includes a set of three subpixel components.

5. A scaling arrangement as recited in claim 4, wherein each subpixel component is indicative of a different color for producing a large number of color shades by a combining process as each subpixel component is activated.

6. A scaling arrangement as recited in claim 5, wherein said combining process is a color additive process.

7. A scaling arrangement as recited in claim 5, wherein said combining process is a color subtractive process.

8. A scaling arrangement as recited in claim 1, wherein each group of X digital signals are arranged in groups of three binary signals indicative of a large number of different color shading levels.

9. A scaling arrangement as recited in claim 8, wherein said large number is at least 57 different shading levels for a single primary color.

10. An arrangement according to claim 1 for coupling a television formatted signal to the display device, the formatted signal having individual red, green and blue color composite signal components to enable the device to produce a large number of different color shading levels, said arrangement further comprising:

formatting means for generating gray scaling signals in response to said television formatted signal;

said gray scaling signals being indicative of the intensity level of individual pixel elements in a composite pixel;

bit map memory means for storing temporarily the gray scaling signals to facilitate driving individual pixel elements of the display device; and pattern means for retrieving individual ones of the gray scaling signals and for arranging said retrieved signals into a group of binary signals for driving individual pixel elements defining said composite pixel, said composite pixel providing a pixel image having at least 57 different color component shading levels for each individual red, green, and blue color composite signal component forming part of the television formatted signal.

11. An arrangement according to claim 10, wherein said formatting means includes:

signal conversion means for converting the composite television signal into RGB analog video signals;

analog to digital conversion means for transforming said analog video signal into individual digital signals indicative of a full color displayable image; and scaling means coupled to said analog to digital conversion means for quantizing said digital signals for storage purposes;

bit memory means for storing said quantized digital signals; and pattern means for retrieving individual ones of said digital signals and for formatting said digital signals into groups of binary signals for driving individual pixel elements defining a composite pixel to produce a full color image.

12. An arrangement according to claim 11, further comprising:

means for substantially eliminating extraneous beat patterns and flicker in said full color image.

13. An arrangement as recited in claim 11, wherein said scaling means includes:

buffer means for temporarily storing said digital signal for quantizing purposes; and encoder means coupled to said buffer means for quantizing said digital signal without introducing any substantial quantization errors.

14. An arrangement as recited in claim 11, wherein said pattern means includes:

means for retrieving the stored quantized digital signals; and means for formatting the retrieved quantized digital signals with a video clock signal to drive said display device.

15. A method for coupling a television formatted signal to a display device, the formatted signal having individual red, green, and blue color composite signal components for enabling the device to produce a large number of different color shading levels, said display device having a matrix of pixel elements arranged in groups to define a plurality of composite pixels, each individual pixel element having a group of subpixel elements with each subpixel element producing at least N shading levels of an individual color in response to said formatted signal, each composite pixel having four quadrant locations, comprising:

converting the formatted signal into a plurality of groups of X digital signals, each group of X digital signals being indicative of at least M shading levels where M is substantially larger than N;

converting each individual group of X digital signals into a plurality of groups of Y signals where Y is substantially smaller than X;

converting said plurality of groups of Y signals into a plurality of groups of Z sub-pixel shading level signals each group of Z shading level signals being indicative of M/4 shading levels;

assigning individual ones of said groups of Z sub-pixel shading level signals to individual ones of sub-pixel elements in a specific quadrant of one of the composite pixels in the plurality of composite pixels;

converting said Z shading level signals into groups of energizing signals;

driving individual ones of the sub-pixel elements so that each composite pixel can exhibit substantially M shading levels for each individual red, green, and blue color composite signal component forming part of the television formatted signal; and changing the quadrant assignments of individual ones of said group of Z sub-pixel shading level signals each display frame to cause individual pixel elements to be gray scaled.

16. A method for displaying a full color image, comprising:

interfacing a video signal producing device to display means, said display means producing a full color image through a plurality of pixel elements, said plurality of pixel elements being arranged in groups of pairs of adjacent pixel elements to define a plurality of composite pixels;

quantizing a device input shading level signal indicative of at least X shading levels into a pair of output shading level signals, each signal being indicative of X/2 shading levels corresponding to one of the pair of pixel elements, said output shading level signals each being quantized and assigned to a specific one of said pair of pixel elements of said composite pixels;

converting said output shading level signals into groups of binary signals each display frame for driving individual ones of the pixel elements so that each composite pixel can exhibit substantially X shading levels of individual ones of a plurality of individual colors each display frame.

17. A method for producing a full color image, comprising:

using display means having a plurality of pixel elements, each individual one of said pixel elements having a group of subpixel elements, where each subpixel element produces at least N shading levels of an individual color;

responding to a computer generated video signal by converting said signal into a plurality of groups of X digital signals, each group of X digital signals being indicative of at least M shading levels where M is substantially larger than N;

converting said plurality of groups of X digital signals into a plurality of groups of Y signals every display frame cycle, where Y is substantially smaller than X;

converting said plurality of groups of Y signals into a plurality of groups of Z subpixel shading level signals, each group of Z shading level signals being indicative of M/4 shading levels;

assigning individual ones of said groups of Z sub-pixel shading level signals to individual ones of sub-pixel elements in a specific quadrant of a composite pixel;

converting said Z shading level signals into groups of energizing signals for driving individual ones of the subpixel elements so that the composite pixel can exhibit substantially M shading levels of individual ones of a plurality of individual colors; and changing every frame cycle the quadrant assignments of individual ones of said group of Z subpixel shading level signals to cause individual pixel elements to be gray scaled.

18. An arrangement for enhancing the number of color shading levels exhibited by display means, said display means producing a full color image through a plurality of pixel elements, said plurality of pixel elements being arranged in groups of pairs of adjacent pixel elements to define a plurality of composite pixels, comprising:

means for interfacing a video signal producing device to the display means;

means for quantizing a device input shading level signal indicative of at least X shading levels into a pair of output shading level signals, each signal being indicative of X/2 shading levels corresponding to one of the pair of pixel elements, said output shading level signals each being quantized and assigned to a specific one of said pair of pixel elements of said composite pixels; and means for converting said output shading level signals into groups of binary signals each display frame for driving individual ones of the pixel elements so that each composite pixel can exhibit substantially X shading levels of individual ones of a plurality of individual colors each display frame.

19. An arrangement according to claim 18 further comprising pattern reversal means for causing the pixel elements in the corresponding pairs of pixel elements to be energized oppositely to substantially eliminate flicker patterns.

* * * * *

UNITED STATES PATENT AND TRADEMARK OFFICE
CERTIFICATE OF CORRECTION

PATENT NO. : 5,264,835
DATED : November 23, 1993
INVENTOR(S) : Robert W. Shaw, Randall S. Farwell It is certified that error appears in the above-indentified patent and that said Letters Patent is hereby corrected as shown below:

Column 2, line 56, after "is", delete "di", and substitute therefor --disclosed--.

Column 2, line 60, after "composite", delete "pxels", and substitute therefor --pixels-- .

Column 13, line 3, delete "espectively" and substitute therefor --respectively-- .

Column 21, line 55, before the row which states "5 3 1", insert a new row, --5 2 1-- .

Column 21, line 56, before the row which states "6 1 2", insert a new row, --6 0 1--.

Column 22, line 41, delete the row which states "20 2 5".

Column 23, line 50, delete "42 2 11" and substitute therefor --42 2 10-- .

Signed and Sealed this

Second Day of August, 1994

*Attest:*

BRUCE LEHMAN

*Attesting Officer*     *Commissioner of Patents and Trademarks*